US012069725B2

(12) United States Patent
Liu et al.

(10) Patent No.: US 12,069,725 B2
(45) Date of Patent: Aug. 20, 2024

(54) STARTING POSITION CONTROL IN CHANNEL OCCUPANCY TIME FOR NEW RADIO SIDELINK COMMUNICATIONS

(71) Applicant: QUALCOMM Incorporated, San Diego, CA (US)

(72) Inventors: Chih-Hao Liu, San Diego, CA (US); Jing Sun, San Diego, CA (US); Yisheng Xue, San Diego, CA (US); Ozcan Ozturk, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 17/455,898

(22) Filed: Nov. 19, 2021

(65) Prior Publication Data

US 2023/0164838 A1    May 25, 2023

(51) Int. Cl.
| | |
|---|---|
| *H04W 74/08* | (2024.01) |
| *H04W 28/02* | (2009.01) |
| *H04W 72/1268* | (2023.01) |
| *H04W 72/23* | (2023.01) |
| *H04W 74/00* | (2009.01) |
| *H04W 74/0816* | (2024.01) |

(52) U.S. Cl.
CPC ... *H04W 74/0816* (2013.01); *H04W 28/0278* (2013.01); *H04W 72/1268* (2013.01); *H04W 72/23* (2023.01); *H04W 74/006* (2013.01)

(58) Field of Classification Search
None
See application file for complete search history.

(56) References Cited

U.S. PATENT DOCUMENTS

| | | | | |
|---|---|---|---|---|
| 11,219,062 | B2 * | 1/2022 | Jeon | H04L 5/0051 |
| 2017/0374677 | A1 * | 12/2017 | Lee | H04W 72/02 |
| 2019/0289615 | A1 * | 9/2019 | Lee | H04W 92/18 |
| 2019/0320452 | A1 * | 10/2019 | Zhang | H04W 72/0446 |
| 2020/0077437 | A1 * | 3/2020 | Stern-Berkowitz | H04W 72/044 |
| 2020/0146082 | A1 * | 5/2020 | Chen | H04W 72/21 |
| 2020/0229198 | A1 * | 7/2020 | Kung | H04W 72/54 |
| 2020/0267729 | A1 * | 8/2020 | Kim | H04W 72/20 |
| 2020/0305191 | A1 | 9/2020 | Moon et al. | |
| 2021/0007096 | A1 * | 1/2021 | Huang | H04L 5/0055 |
| 2021/0144743 | A1 * | 5/2021 | Rastegardoost | H04W 72/23 |

(Continued)

OTHER PUBLICATIONS

Partial International Search Report—PCT/US2022/047618—ISA/EPO—Feb. 21, 2023.

(Continued)

*Primary Examiner* — Clemence S Han
(74) *Attorney, Agent, or Firm* — QUALCOMM Incorporated

(57) ABSTRACT

Wireless communications systems and methods related to communicating control information are provided. A method of wireless communication performed by a first sidelink user equipment (UE) may include receiving, from a base station (BS), an indicator indicating a set of start times associated with a transmission opportunity, performing a listen-before-talk (LBT) procedure for the transmission opportunity, and transmitting, to a second UE, a communication starting at a selected start time of the set of start times based on the LBT procedure being successful.

28 Claims, 9 Drawing Sheets

(56) References Cited

U.S. PATENT DOCUMENTS

| | | | | |
|---|---|---|---|---|
| 2021/0314821 A1* | 10/2021 | Huang | ............... | H04L 5/1438 |
| 2021/0344451 A1* | 11/2021 | Hedayat | ............... | H04L 1/1861 |
| 2021/0410163 A1* | 12/2021 | Xia | ............... | H04W 74/002 |
| 2022/0086803 A1* | 3/2022 | Li | ............... | H04W 72/0446 |
| 2022/0183060 A1* | 6/2022 | Li | ............... | H04W 72/0453 |
| 2022/0312389 A1* | 9/2022 | Li | ............... | H04W 72/02 |
| 2022/0400469 A1* | 12/2022 | Li | ............... | H04W 74/0808 |
| 2023/0064680 A1* | 3/2023 | Huang | ............... | H04L 1/1848 |
| 2023/0082591 A1* | 3/2023 | Ohta | ............... | H04W 72/21 |
| | | | | 370/329 |
| 2023/0084524 A1* | 3/2023 | Zhang | ............... | H04L 5/0082 |
| | | | | 370/329 |
| 2023/0171738 A1* | 6/2023 | Di Girolamo | ............... | H04W 72/20 |
| | | | | 370/329 |

OTHER PUBLICATIONS

International Search Report and Written Opinion—PCT/US2022/047618—ISA/EPO—May 2, 2023.

\* cited by examiner

STARTING POSITION CONTROL IN CHANNEL OCCUPANCY TIME FOR NEW RADIO SIDELINK COMMUNICATIONS

TECHNICAL FIELD

This application relates to wireless communication systems, and more particularly, to starting position control in channel occupancy time for new radio sidelink communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a first sidelink user equipment (UE) may include receiving, from a base station (BS), an indicator indicating a set of start times associated with a transmission opportunity; performing a listen-before-talk (LBT) procedure for the transmission opportunity; and transmitting, to a second UE, a communication starting at a selected start time of the set of start times based on the LBT procedure being successful.

In an additional aspect of the disclosure, a method of wireless communication performed by a base station (BS) may include transmitting, to a first user equipment (UE), an indicator indicating a set of start times associated with a transmission opportunity; selecting a start time from the set of start times based on a priority level associated with the first UE; and transmitting, to the first UE, an indication of the selected start time.

In an additional aspect of the disclosure, a first sidelink user equipment (UE) may include a memory; a transceiver; and at least one processor coupled to the memory and the transceiver, wherein the first sidelink UE is configured to receive, from a base station (BS), an indicator indicating a set of start times associated with a transmission opportunity; perform a listen-before-talk (LBT) procedure for the transmission opportunity; and transmit to a second UE, a communication starting at a selected start time of the set of start times based on the LBT procedure being successful.

In an additional aspect of the disclosure, a base station (BS) may include a memory; a transceiver; and at least one processor coupled to the memory and the transceiver, wherein the BS is configured to transmit, to a first user equipment (UE), an indicator indicating a set of start times associated with a transmission opportunity; select a start time from the set of start times based on a priority level associated with the first UE; and transmit, to the first UE, an indication of the selected start time.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

DETAILED DESCRIPTION

Figure 1:
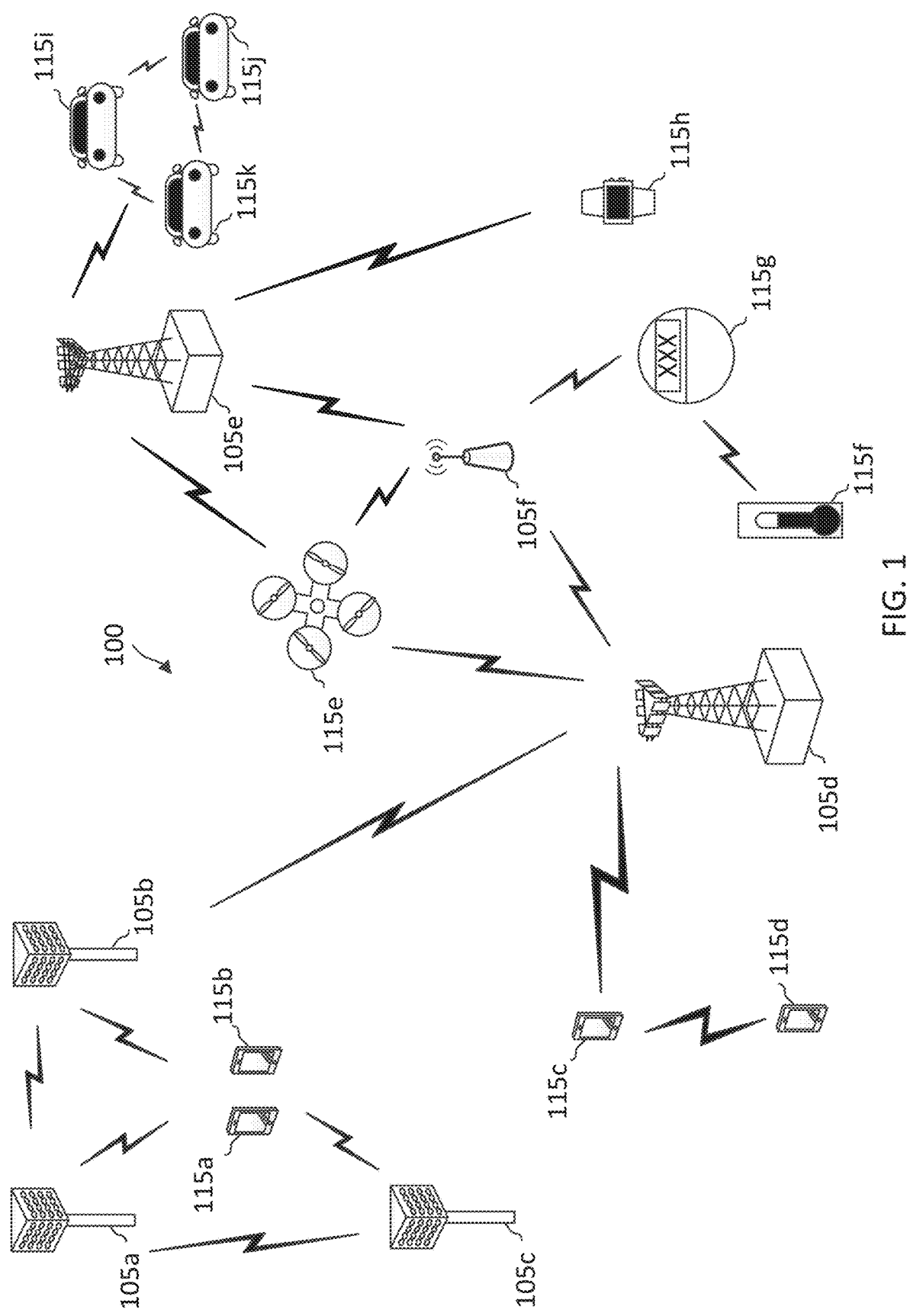
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting.

Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Aspects of the present disclosure may provide several benefits. A UE may receive an indicator indicating a set of start times associated with a transmission opportunity from BS. The set of start times may indicate a time when the UE may begin to transmit a communication (e.g., a transport block(TB)) to another UE after the UE performs a listen-before-talk (LBT) procedure that passes. In this manner, the BS may increase the spatial diversity of the network in a shared frequency band and increase the overall performance of the network through the use of start times.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some aspects, the UEs 115c and UE 115d may be sidelink UEs. The UE 115c may receive an indicator indicating a set of start times associated with a transmission opportunity from the BS 105. The UE 115*c* may receive the indicator indicating the set of start times associated with the TXOP from the BS 105 in a physical downlink control channel (PDCCH), a physical broadcast channel (PBCH), a physical downlink shared channel (PDSCH), or other suitable channel. In some aspects, the UE 115*c* may receive the indicator in downlink control information (e.g., a DCI3_x or other DCI communication format). The UEs 115*c* and 115*d* may operate in a licensed and/or unlicensed frequency band. The set of start times may indicate a time when the UE 115*c* may begin to transmit a communication (e.g., a transport block(TB)) to the UE 115*d* after the UE 115*c* performs a listen-before-talk (LBT) procedure that passes. In this manner, the BS may increase the spatial diversity of the network in a shared frequency band and increase the overall performance of the network through the use of start times.

Figure 2:
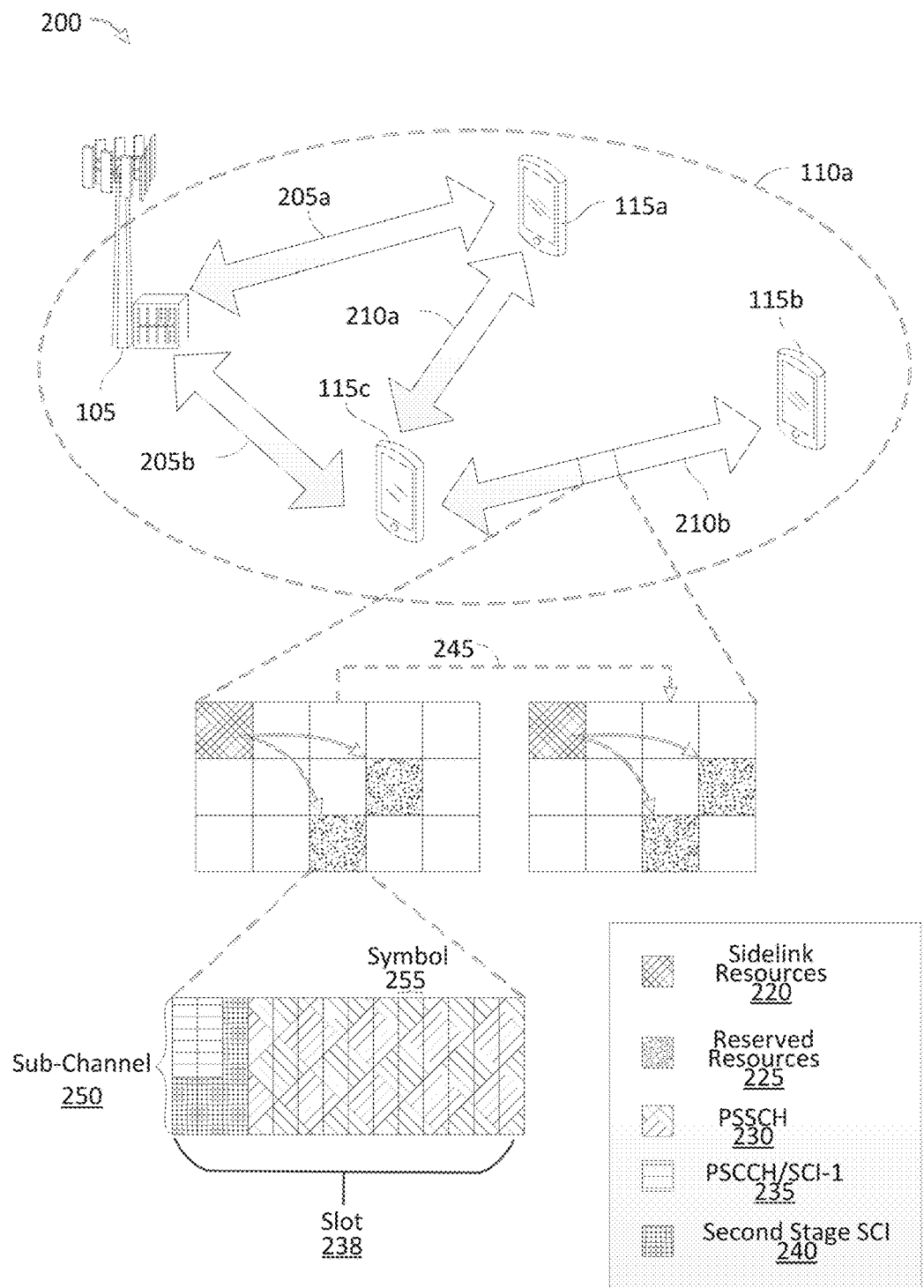
FIG. 2 illustrates a sidelink wireless communication network according to some aspects of the present disclosure.

FIG. 2 illustrates sidelink resources associated with a wireless communication network 200 according to some aspects of the present disclosure. The wireless communications network 200 may include a base station 105*a* and UEs 115*a*, 115*b*, and 115*c*, which may be examples of a BS 105 and a UE 115 as described with reference to FIG. 1. Base station 105*a* and UEs 115*a* and 115*c* may communicate within geographic coverage area 110*a* and via communication links 205*a* and 205*b*, respectively. UE 115*c* may communicate with UEs 115*a* and 115*b* via sidelink communication links 210*a* and 210*b*, respectively. In some examples, UE 115*c* may transmit SCI to UEs 115*a* and 115*b* via the sidelink control resources 220. The SCI may include an indication of resources reserved for retransmissions by UE 115*c* (e.g., the reserved resources 225). In some examples, UEs 115*a* and 115*b* may determine to reuse one or more of the reserved resources 225.

In some aspects, a device in the wireless communication network 200 (e.g., a UE 115, a BS 105, or some other node) may convey SCI to another device (e.g., another UE 115, a BS 105, sidelink device or vehicle-to-everything (V2X) device, or other node). The SCI may be conveyed in one or more stages. The first stage SCI may be carried on the PSCCH while the second stage SCI may be carried on the corresponding PSSCH. For example, UE 115*c* may transmit a PSCCH/first stage SCI 235 (e.g., SCI-1) to each sidelink UE 115 in the network (e.g., UEs 115*a* and 115*b*) via the sidelink communication links 210. The PSCCH/first stage SCI-1 235 may indicate resources that are reserved by UE 115*c* for retransmissions (e.g., the SCI-1 may indicate the reserved resources 225 for retransmissions). Each sidelink UE 115 may decode the first stage SCI-1 to determine where the reserved resources 225 are located (e.g., to refrain from using resources that are reserved for another sidelink transmission and/or to reduce resource collision within the wireless communications network 200). Sidelink communication may include a mode 1 operation in which the UEs 115 are in a coverage area of BS 105*a*. In mode 1, the UEs 115 may receive a configured grant from the BS 105*a* that defines parameters for the UEs 115 to access the channel. Sidelink communication may also include a mode 2 operation in which the UEs 115 operate autonomously from the BS 105*a* and perform sensing of the channel to gain access to the channel. In some aspects, during mode 2 sidelink operations, the sidelink UEs 115 may perform channel sensing to locate resources reserved by other sidelink transmissions. The first stage SCI-1 may reduce the need for sensing each channel. For example, the first stage SCI-1 may include an explicit indication such that the UEs 115 may refrain from blindly decoding each channel. The first stage SCI-1 may be transmitted via the sidelink control resources 220. The sidelink control resources 220 may be configured resources (e.g., time resources or frequency resources) transmitted via a PSCCH 235. In some examples, the PSCCH 235 may be configured to occupy a number of physical resource blocks (PRBs) within a selected frequency. The frequency may include a single subchannel 250 (e.g., 10, 12, 15, 20, 25, or some other number of RBs within the subchannel 250). The time duration of the PSCCH 235 may be configured by the BS 105*a* (e.g., the PSCCH 235 may span 1, 2, 3, or some other number of symbols 255).

The first stage SCI-1 may include one or more fields to indicate a location of the reserved resources 225. For example, the first stage SCI-1 may include, without limitation, one or more fields to convey a frequency domain resource allocation (FDRA), a time domain resource allocation (TDRA), a resource reservation period 245 (e.g., a period for repeating the SCI transmission and the corresponding reserved resources 225), a modulation and coding scheme (MCS) for a second stage SCI-2 240, a beta offset value for the second stage SCI-2 240, a DMRS port (e.g., one bit indicating a number of data layers), a physical sidelink feedback channel (PSFCH) overhead indicator, a priority, one or more additional reserved bits, or a combination thereof. The beta offset may indicate the coding rate for transmitting the second stage SCI-2 240. The beta offset may indicate an offset to the MCS index. The MCS may be indicated by an index ranging from 0 to 31. For example, if the MCS is set at index 16 indicating a modulation order of 4 and a coding rate of 378, the beta offset may indicate a value of 2 thereby setting the coding rate to 490 based on an MCS index of 18. In some examples, the FDRA may be a number of bits in the first stage SCI-1 that may indicate a number of slots 238 and a number of subchannels reserved for the reserved resources 225 (e.g., a receiving UE 115 may determine a location of the reserved resources 225 based on the FDRA by using the subchannel 250 including the PSCCH 235 and first stage SCI-1 as a reference). The TDRA may be a number of bits in the first stage SCI-1 (e.g., 5 bits, 9 bits, or some other number of bits) that may indicate a number of time resources reserved for the reserved resources 225. In this regard, the first stage SCI-1 may indicate the reserved resources 225 to the one or more sidelink UEs 115 in the wireless communication network 200.

In some aspects, the UEs 115*a* and UE 115*c* may be sidelink UEs. The UE 115*a* may receive an indicator indicating a set of start times associated with a transmission opportunity (TXOP) from the BS 105. The UE 115*a* may receive the indicator indicating the set of start times associated with the TXOP from the BS 105 in a physical downlink control channel (PDCCH), a physical broadcast channel (PBCH), a physical downlink shared channel (PDSCH), or other suitable channel. In some aspects, the UE 115*a* may receive the indicator in downlink control information (e.g., a DCI3_x or other DCI communication format). The UEs 115*a* and 115*c* may operate in a licensed and/or unlicensed frequency band. The set of start times may indicate a time when the UE 115*a* may begin to transmit a communication (e.g., a transport block (TB)) to the UE 115*c* after the UE 115*a* performs a listen-before-talk (LBT) procedure that passes. In this manner, the BS may increase the spatial diversity of the network in a shared frequency band and increase the overall performance of the network through the use of start times.

Figure 3:
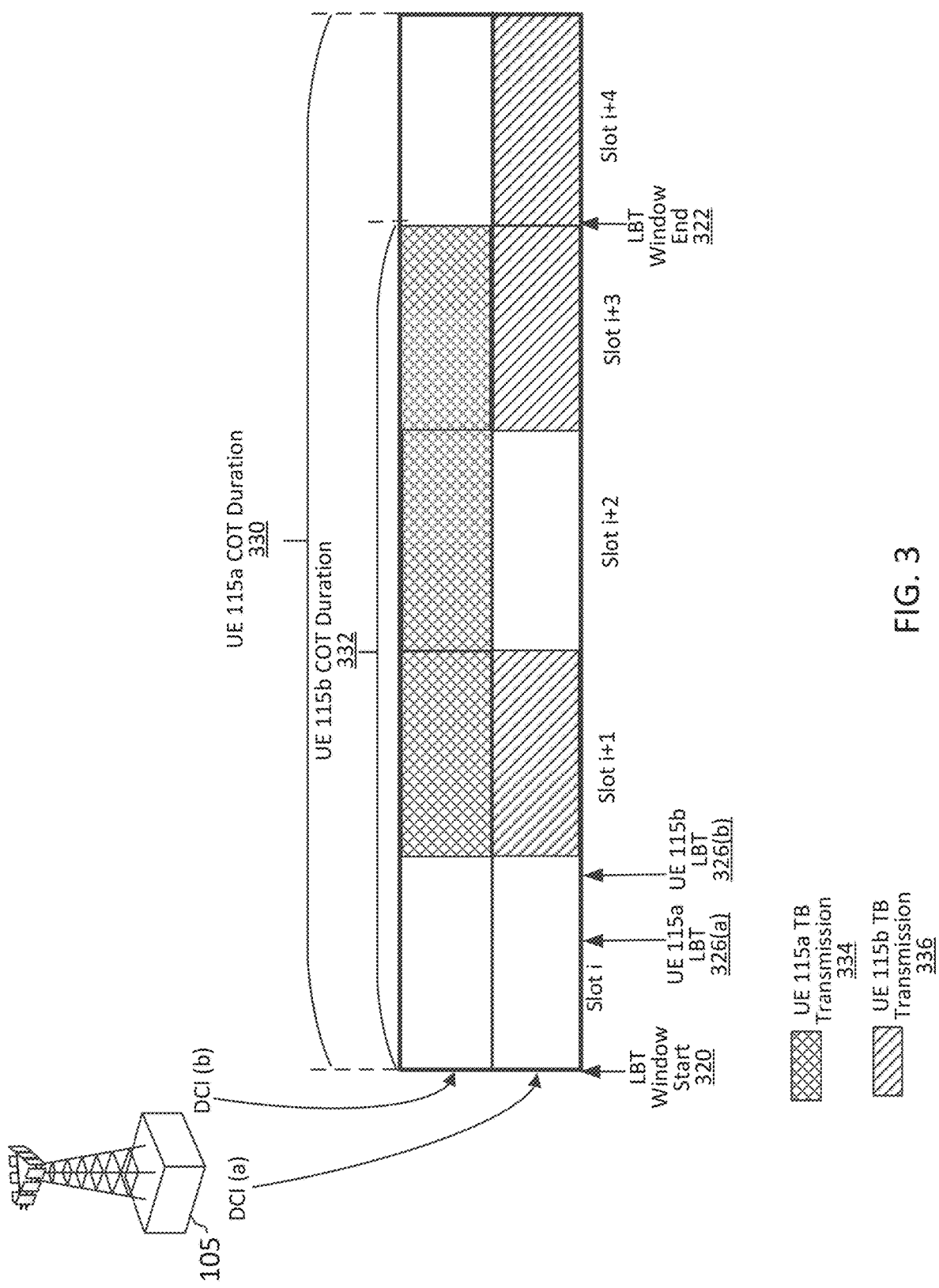
FIG. 3 illustrates resources associated with a channel occupancy time (COT) according to some aspects of the present disclosure.

FIG. 3 illustrates resources granted for COT contention according to some aspects of the present disclosure. In FIG. 3, the x-axis represents time in some arbitrary units and the y-axis represents frequency in some arbitrary units. In some aspects, a UE 115a may receive a configuration indicating a listen-before-talk (LBT) window from a BS 105. A UE 115b may receive a configuration indicating a listen-before-talk (LBT) window from the BS 105. The UE 115b may receive the same configuration as the UE 115a or a different configuration as the UE 115a. The configuration may indicate an LBT window start 320 and an LBT window end 322. In this regard, the UE 115 may receive the configuration from the BS 105 in a downlink control information (DCI) message (e.g., a DCI3 message). The UE 115 may receive the configuration via a physical downlink control channel (PDCCH), a physical broadcast channel (PBCH), a physical downlink shared channel (PDSCH), or other suitable channel. The UE 115 may operate in a sidelink mode 1 in which the UE 115 is in communication with the BS 105 in order to receive the configuration from the BS 105. The LBT window may be a time period between the LBT window start 320 and the LBT window end 322 in which the UE 115 may perform an LBT to gain a channel occupancy time (COT) in which the UE 115 may transmit data (e.g., transmit data in a transport block). As a result of the UE 115 contending for the COT by performing one or more LBT(s) within an LBT window time period, the wireless network (e.g., wireless network 100, 200) may reduce control traffic and latency as compared to the UE 115 reporting a HARQ process to the BS 105 and requesting a DCI grant from the BS 105 each time an LBT is performed unsuccessfully. In this regard, the BS 105 may refrain from scheduling the transmission of each TB, thereby reducing network traffic, including reducing PUCCH communications.

In some aspects, the LBT window start 320 may be indicated in the configuration by a pointer. The pointer for the LBT window start 320 may be to a starting slot i or a starting sub-slot. In some aspects, a slot (e.g., slot i, slot i+1, etc.) may be partitioned into sub-slots. A sub-slot may include a number of symbols (e.g., contiguous symbols) within the slot. For example, a sub-slot may include 1, 2, 3, 4, 5, or more symbols within the slot. Although the example of FIG. 3 shows the configuration on a slot basis, the present disclosure is not so limited and the configuration may be on a sub-slot basis.

The pointer for the start of the LBT window may be a slot index (e.g., slot i) or a sub-slot index that indicates the LBT window start 320. In some instances, the pointer for the LBT window start 320 may be indicated relative to a slot that includes the configuration (e.g., a slot prior to slot i). For example, the pointer for the LBT window start 320 may be indicated by an index relative to a slot carrying a DCI message (e.g., a unicast DCI_3 message and/or a groupcast DCI_3 message) that includes the configuration.

In some aspects, the LBT window end 322 may also be indicated in the configuration by a pointer. The pointer for the LBT window end 322 may be to an ending slot or an ending sub-slot. The pointer for the LBT window end 322 may be to slot index i+4 or a sub-slot index that points to the ending sub-slot of the LBT window. The pointer for the LBT window end 322 may be indicated by an index relative to the starting slot i or the starting sub-slot of the LBT window. For example, the LBT window end 322 may be indicated as a number of slots or sub-slots after the LBT window start 320.

In some aspects, the UE 115 may receive the configuration from the BS 105 in a shared radio frequency band. The configuration may include a frequency domain resource allocation (FDRA) that indicates at least one frequency range in the shared radio frequency band. For example, UE 115a may be configured to communicate in frequency range j. The UE 115b may be configured to communicate in frequency range j+1. A shared radio frequency band may include a licensed radio frequency band and/or an unlicensed radio frequency band. The unlicensed radio frequency band may include a 2.4 GHz band, a 3.5 GHz band, a 5 GHz band, a 6 GHZ band, a 37 GHz band, an FR2 band, an FR2x band, a frequency band in the range of about 60 GHz to about 71 GHz, and/or other unlicensed frequency band. In some instances, the UE 115 may receive the configuration from the BS 105 in a licensed radio frequency band. In order to reduce signaling overhead in the wireless network (e.g., the wireless network 100 or 200), the configuration may not include parameters including new data indicator (NDI), hybrid automatic repeat request process identification (HARQ ID), the K1 offset between the DL slot where the data is scheduled on PDSCH and the UL slot where the HARQ ACK/NACK feedback for the scheduled PDSCH data, and PUCCH resource indicator (PRI).

In some aspects, the configuration may be based on a topology of a wireless network (e.g., wireless network 100 or 200) that includes at least the UE 115a, the UE 115b, and the BS 105. The topology of the network may include information associated with the relative positions and/or absolute positions of the UE 115a, the UE 115b, and the BS 105. The BS 105 may determine the topology of the network using any suitable method. For example, the BS 105 may receive information from the UE 115a and/or the UE 115b indicating their absolute position in the network. The UE 115a and/or the UE 115b may determine their position based on a global navigation satellite system (GNSS) and transmit the position to the BS 105. In some aspects, the BS 105 may use beamforming techniques, radio frequency triangulation, received signal strength indicators, and/or other suitable position determining methods to determine the network topology. The BS 105 may generate LBT window configurations for the UE 115a and/or the UE 115b based on the relative position of the UE 115a with respect to the UE 115b. For example, the BS 105 may generate configurations with overlapping (e.g., common) resources for the UE 115a and the UE 115b that are separated by a distance by which the transmissions of the UE 115a and/or the UE 115b are unlikely to interfere with one another. In some aspects, the BS 105 may generate configurations with non-overlapping (e.g., separate) resources for the UE 115a and the UE 115b when the UE 115a and the UE 115b are in close proximity to each other so that their respective transmissions do not interfere with one another.

In some aspects, the configuration includes a maximum COT duration 330, 332. The maximum COT duration 330 assigned to UE 115a may extend past the LBT window end 322. The maximum COT duration 332 assigned to UE 115b may be approximately equal to the LBT window between the LBT window start 320 and the LBT window end 322. The configuration may further indicate resources associated with the COT durations 330, 332. In this regard, the configuration may include time/frequency resources signaled via a DCI3 message. The time resources may be indicated in a time domain resource allocation (TDRA). The frequency resources may be indicated in a frequency domain resource allocation (FDRA). The configuration may include a start and an end associated with the COT durations 330, 332. For example, the configuration for UE 115a may include an indicator indicating a starting slot i and an ending slot i+4 associated with the maximum COT duration 330. The configuration for UE 115b may include an indicator indicating a starting slot i and an ending slot i+3 associated with the maximum COT duration 332.

In some aspects, the COT durations 330, 332 may start at any slot within the LBT window. The COT durations 330, 332 may start at any slot occurring after the LBT window start 320 and before the LBT window end 322. For example, referring to FIG. 3, the COT durations 330, 332 may start at slot i, slot, i+1, slot i+2, or slot i+3. The maximum COT duration 330 assigned to UE 115a may start at slot i, slot, i+1, slot i+2, or slot i+3 and extend past the LBT window end 322. The maximum COT duration 332 assigned to UE 115b may start at slot i, slot, i+1, slot i+2, or slot i+3 and extend past the LBT window end 322.

In some aspects, the UE 115a may transmit a TB(s) 336 during the maximum COT duration 330 after performing a successful LBT at LBT 326(a). The TB(s) 336 may be transmitted in slots i+1, i+2, i+3, and i+4, based on the amount of data to be transmitted in the TB(s) 336. In some aspects, the UE 115b may transmit a TB(s) 334 during the maximum COT duration 332 after performing a successful LBT at LBT 326(b). The TB(s) 334 may be transmitted in slots i+1, i+2, and i+3, based on the amount of data to be transmitted in the TB(s) 334. In some aspects, the UE 115a may perform a successful LBT at LBT 326(a) and block the UE 115b from performing a successful LBT at LBT 326(b).

Figure 4:
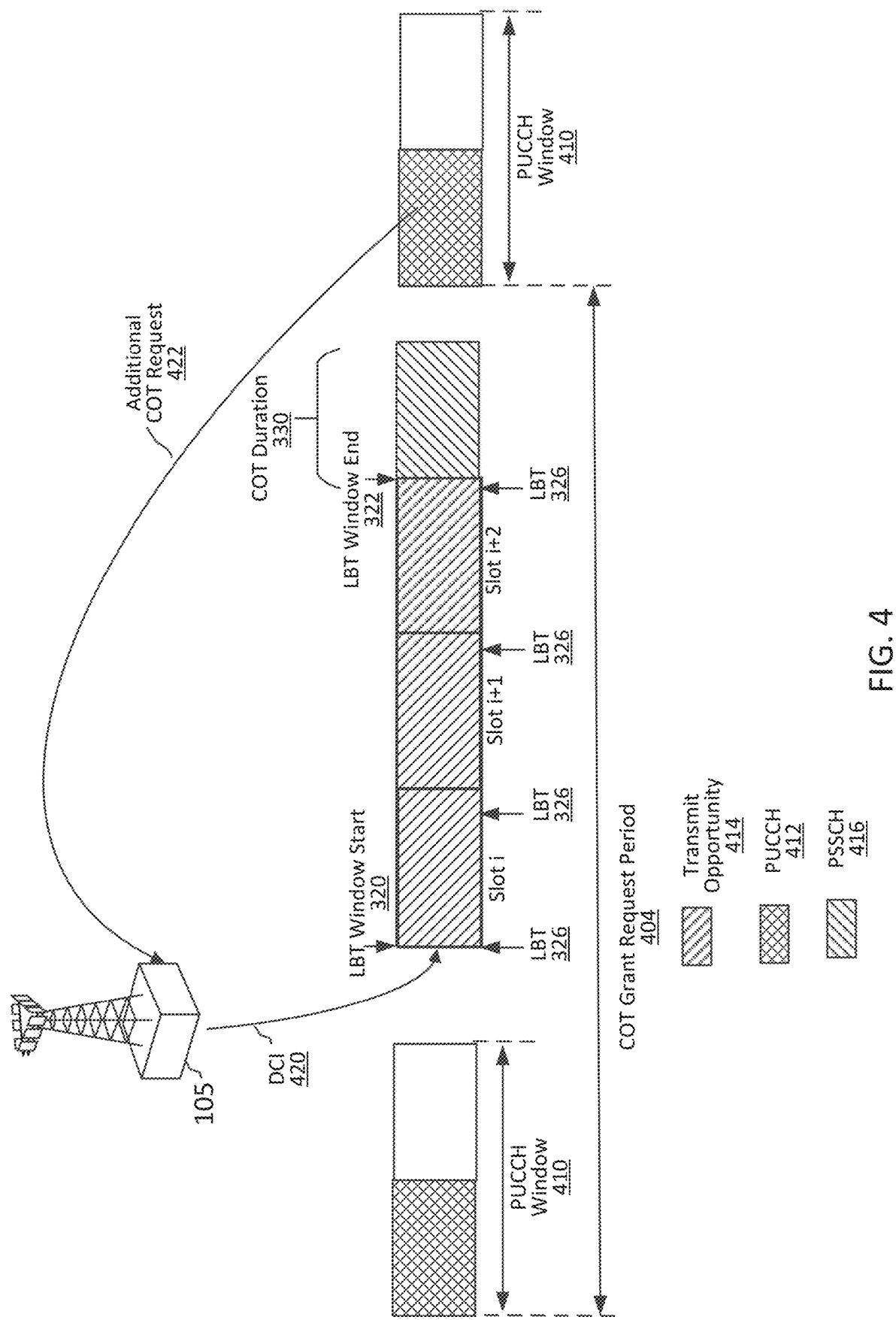
FIG. 4 illustrates resources associated with a COT grant request according to some aspects of the present disclosure.

FIG. 4 illustrates resources associated with a COT grant request according to some aspects of the present disclosure. In some aspects, the UE 115 may receive an indicator indicating a set of start times associated with a transmission opportunity (TXOP) 414 from the BS 105. In some aspects, the UE 115 may operate in sidelink mode 1 in which the UE 115 is in communication with the BS 105 in order to receive the indicator from the BS 105. In this regard, the UE 115 may receive the indicator indicating the set of start times associated with the TXOP 414 in a physical downlink control channel (PDCCH), a physical broadcast channel (PBCH), a physical downlink shared channel (PDSCH), or other suitable channel. In some aspects, the UE 115 may receive the indicator in downlink control information (DCI) 420 (e.g., a DCI3_x or other DCI communication format). The UE 115 may be a sidelink UE 115 operating in a licensed and/or unlicensed frequency band. The set of start times may indicate a time when the UE 115 may begin to transmit a communication (e.g., a transport block(TB)) to a second UE 115 after the UE 115 performs a listen-before-talk (LBT) procedure that passes.

In some aspects, the UE 115 may transmit the TB within a COT duration 330. The COT duration 330 may be a number of slots and/or sub-slots allocated to the UE 115 for transmitting the TB(s). The COT duration 330 may be based on an amount of data (e.g., in TB(s)) the UE 115 needs to transmit to the second UE 115. A larger amount of data (e.g., more TB(s)) may require a longer COT duration 330 as compared to a smaller amount of data (e.g., less TB(s)). In some instances, the UE 115 may indicate the amount of data to be transmitted in a buffer status report (BSR). In this regard, the UE 115 may transmit the BSR to the BS 105 in a physical uplink control channel (PUCCH) 412 and/or a physical uplink shared channel (PUSCH). In some aspects, the set of start times may be absolute start times (e.g., based on a global navigation satellite system (GNSS or GPS) timing signal, a real time clock or timer) or relative start times (e.g., relative to a reference time or occurrence). For example, in some instances each start time of the set of start times may be relative to a slot (e.g., slot (i)) boundary and/or a sub-slot boundary. The set of start times may include start times before and/or after the slot boundary and/or the sub-slot boundary. For example, the set of start times may include a set of start times prior to a slot boundary. In some aspects, each start time of the set of start times may be offset from the slot boundary, sub-slot boundary, and/or other reference point by an integer multiple of a time period (e.g., 9 microseconds or other suitable amount of time). For example, the set of start times may include start times at 0×9 microseconds (e.g., the slot boundary), 1×9 microseconds, 2×9 microseconds, etc. before (and/or after) the slot boundary, sub-slot boundary, and/or other reference point. In some aspects, the indicator indicating the set of start times may include a set of integer multiples of the time period.

In some aspects, the BS 105 may control which UEs 115 in the network (e.g., the network 100 or 200) gain access to the TXOP 414 based on start time. For example, the BS 105 may assign a start time (or a set of start times) to one or more UEs 115 that is earlier than a start time (or a set of start times) assigned to one or more other UEs 115. In this fashion, the UE(s) 115 with the earlier start time(s) may begin to transmit a communication earlier than the other UE(s) 115. For example, a first UE 115 may have a start time earlier than a second UE 115. The first UE 115 may perform a successful LBT 326 and begin transmission of a communication (e.g., a TB). The second UE 115 may have a start time that coincides with the transmission of the TB by the first UE 115, which may cause the LBT 326 of the second UE 115 to be unsuccessful and prevent the second UE 115 from transmitting during the TXOP 414 while the first UE 115 is transmitting/occupying a portion of the TXOP 414. The second UE 115 may perform an LBT 326 after the first UE 115 has finished transmitting/occupying the portion of the TXOP 414 and may transmit a communication (e.g., a TB) based on a successful LBT 326 during another portion of the TXOP 414 (or a subsequent TXOP). In some aspects, the first UE 115 may not successfully perform the LBT 326 due to interference in the transmission channel (e.g., interference from other transmitters). However, the second UE 115 may be spatially separated from the first UE 115 and not subject to the same level of interference. In this case, the second UE 115 with the later start time may gain access to the COT and transmit a communication based on a successful LBT 326. In this manner, the BS 105 may increase the spatial diversity of the network (e.g., the network 100 or 200) and increase the overall performance of the network through the use of start times.

The BS 105 may prioritize which UEs 115 may transmit based on controlling the start times. In some aspects, the BS 105 may determine the start time or the set of start times based on a packet delay budget associated with the communication that the UE 115 intends to transmit.

In some aspects, the BS 105 may determine a start time for the UE 115 and transmit an indication of the start time to the UE 115. In some aspects, the UE 115 may receive the indication of the start time from the BS 105 in the DCI 420 (e.g., a DCI3_x or other DCI communication format). Additionally or alternatively, the BS 105 may transmit a subset of the set of start times to the UE 115 and indicate which start time of the subset of start times the UE 115 may use. For example, the BS 105 may transmit a code point in a DCI_3x message that indicates which start time of the subset of the set of start times the UE 115 may use. Additionally or alternatively, the BS 105 may transmit the subset of start times to the UE 115 and the UE 115 may select (e.g., randomly and/or based on a pattern or other formula) one of the start times of the subset of the set of start times.

In some aspects, the UE 115 may perform an LBT 326 procedure for the transmission opportunity 414. In some aspects, the UE 115 may receive an LBT 326 configuration. In this regard, the UE 115 may receive the LBT 326 configuration from the BS 105 via the DCI 420, a physical downlink control channel (PDCCH), a physical broadcast channel (PBCH), a physical downlink shared channel (PDSCH), or other suitable channel. The LBT 326 configuration may include a maximum COT duration 330. The maximum COT duration 330 may be based on a buffer status report (BSR) received by the BS 105 from the UE 115. The LBT 326 configuration may further indicate resources including time/frequency resources signaled via the DCI 420 message or other suitable message. The time resources may be indicated in a time domain resource allocation (TDRA). The time resources may include slot (i), slot (i+1), slot (i+2), etc. The frequency resources may be indicated in a frequency domain resource allocation (FDRA). The LBT 326 configuration may include a start and an end associated with the COT duration 330. For example, the LBT 326 configuration may include an indicator indicating a starting slot (e.g., slot (i)) and/or starting sub-slot associated with the COT duration 330. The configuration may include an indicator indicating an ending slot and/or ending sub-slot associated with the COT duration 330. In some instances, the start and/or end indicators of the COT duration 330 may include slot indexes and/or sub-slot indexes. The LBT 326 configuration may include the type of LBT 326 (e.g., a frame-based equipment (FBE)-based LBT and/or a load-based equipment (LBE)-based LBT), the category of LBT (e.g., CAT2-LBT and/or CAT4-LBT), and/or at least one direction (e.g., a beam direction) associated with the LBT.

In some aspects, the UE 115 may perform the LBT 326 within an LBT window time period indicated by the LBT 326 configuration. The LBT window time period may begin at the LBT window start 320 and end at the LBT window end 322. The UE 115 may perform the LBT 326 for the COT in a shared radio frequency band during the LBT window. In this regard, the UE 115 may perform the LBT 326 for the COT in at least one frequency range in the shared radio frequency band. In some aspects, the at least one frequency range in the shared radio frequency band includes a plurality of contiguous frequencies in the shared radio frequency band. For example, the contiguous frequencies may include multiple subchannels that are contiguous over a range of frequencies. The LBT 326 configuration may include an indicator (e.g., a bitmap) indicating which frequencies the UE 115 may perform the LBT 326 in the shared radio frequency band. In some aspects, the BS 105 may configure multiple UEs 115 with the same and/or different frequency ranges to perform an LBT 326. In some aspects, the frequency ranges for each of the UEs 115 may be contiguous. In some aspects, the frequency ranges for the UEs 115 may be interleaved with one another. For example, the UE 115 may be configured with frequency ranges having even indexes and another UE 115 may be configured with frequency ranges having odd indexes. However, any type or arrangement of interleaving of frequencies may be utilized. In some aspects, the BS 105 may configure (e.g., assign) overlapping time and/or frequency resources to multiple UEs 115. Each of the UEs 115 assigned with the overlapping time and/or frequency resources may compete for the COT by performing an LBT 326 in the overlapping resources based on one or more start times assigned to the UE 115. The UE 115 may first sense the communications channel during the LBT window to determine if there are other devices using the channel prior to any transmission by the UE 115. In some aspects, the channel sensing procedure may rely on detecting energy levels on one or multiple sub-bands of the shared radio frequency band. The UE 115 may perform the LBT 326 in one or more beam direction(s) (e.g., 1, 2, 4, 8, 16, or more beam directions). In some instances, the beam direction(s) may be towards another sidelink UE 115 that the UE 115 intends to communicate with. The UE 115 may configure its receiver to the specific beam direction and perform the LBT 326 in the specific beam direction.

In some aspects, the UE 115 may perform an unsuccessful LBT 326 by sensing the energy in the channel and determining the sensed energy is above a threshold. In response to determining the LBT 326 was unsuccessful, the UE 115 may wait a period of time (e.g., a random back-off time period, a pre-configured back-off time period) and perform another LBT 326 after waiting the period of time. In some aspects, the UE 115 may wait a period of time before performing another LBT 326 based on the next available start time. The sequence of determining an unsuccessful LBT 326, waiting the period of time, and performing another LBT 326 may be repeated multiple times during the LBT window. In the example shown in FIG. 4, the LBT 326 is performed 4 times within the LBT window. However, the present disclosure is not so limited and any number of LBTs 326 may be performed in the LBT window.

In some aspects, the UE 115 may transmit a communication (e.g., a transport block (TB)) to a second UE 115 starting at a selected start time of the set of start times based on the LBT 326 procedure being successful. If the LBT 326 procedure is successful, then the UE 115 may transmit one or more TB to the second UE 115. In this regard, the UE 115 may transmit the TB(s) to the second UE 115 in a physical sidelink shared channel (PSSCH). The UE 115 may transmit the TB(s) to the second UE 115 in at least one beam direction that has successfully cleared the LBT 326. In some aspects, the UE 115 may transmit the one or more TBs based on the LBT 326 configuration received from the BS 105. In some aspects, the UE 115 and the second UE 115 may execute a HARQ process for the potential retransmission of the TB.

In some aspects, the UE 115 may not perform a successful LBT 326 during the LBT window. In this case, the UE 115 may transmit a request 422 to the BS 105 for additional COT resources. In some aspects, the UE 115 may perform a successful LBT 326 and transmit TB(s) during the COT, but may not have been provided enough resources to complete transmission of all the TBs the UE 115 intends to transmit. In this case, the UE 115 may transmit a request 422 to the BS 105 for additional COT resources to finish transmitting the TBs in the UE 115's buffer. In some aspects, the UE 115 may perform a successful LBT 326 and transmit TB(s) during the COT, but the receiving UE 115 may not successfully decode the TB(s). In this case, the UE 115 may transmit a request 422 to the BS 105 for additional COT resources to retransmit the TBs that were not successfully decoded by the second (e.g., receiving) UE 115.

The UE 115 may transmit the request 422 for additional COT resources via the PUCCH 412. In this regard, the BS 105 may configure periodic resources for the UE 115 to transmit the request 422 for additional COT resources. For example, the BS 105 may reserve periodic time and frequency resources for the UE 115 to transmit the request 422 for additional COT resources via the PUCCH 412. In this regard, the BS 105 may transmit an indication of the periodic PUCCH 412 resources in an RRC message and/or a DCI_3 message. In response to receiving the request 422 for additional COT resources, the BS 105 may configure the UE 115 for the additional resources for sidelink communications. In some instances, the BS 105 may repeatedly provide additional COT resources until the UE 115 has successfully transmitted all of the TBs the UE 115 has scheduled to transmit in its buffer. In some instances, the BS 105 may provide the UE 115 with the same amount of resources as in the original resource allocation. For example, prior to performing the LBT 326, the UE 115 may transmit a buffer status report (BSR) indicating an amount of TBs the UE 115 intends to transmit (e.g., the amount of TBs the UE 115 has scheduled to transmit in its buffer). The BS 105 may configure the resources allocated to the UE 115 based on the BSR. If the UE 115 performs a successful LBT 326, but fails to transmit all of its TBs, or transmits one or more TBs that are not successfully decoded by the receiving UE 115, then the BS 105 may configure the additional resources based on the previously transmitted BSR. In some aspects, the BS 105 may configure the additional resources based on an updated BSR that reflects the results of the UE 115 transmitting TB(s). For example, the BS 105 may transmit a grant for the additional COT resources having the same start time and the same COT duration 330 as the previous grant. In some aspects, the BS 105 may transmit a grant for the additional COT resources based on an amount of data left to be transmitted by the UE 115 based on an updated BSR. In some aspects, the BS 105 may transmit a grant for the additional COT resources based on the number of retransmissions required by the UE 115. In some aspects, the UE 115 may transmit to the BS 105 a request 422 for additional COT resources indicating the amount of resources requested by the UE 115. In response to receiving the request 422, the BS 105 may transmit the additional COT grant indicating the amount of resources requested by the UE 115.

In some aspects, the PUCCH 412 resources assigned by the BS 105 for requesting additional COT resources may be resources previously assigned to the UE 115 for ACK/NACK feedback to the BS 105. For example, the indicator transmitted by the UE 115 via the PUCCH 412 indicating the request 422 for additional COT resources may be a code point in the PUCCH 412. In this regard, the code point may be a single bit indicating the request. For example, if the code point has a value of '0' the UE 115 does not request additional COT resources. If the code point has a value of '1' the UE 115 requests additional COT resources. Using a single bit code point for indicating the request 422 for additional COT resources may reduce network overhead compared to using a multi-bit code point, a medium access control-control element (MAC-CE) message, or a scheduling request for requesting the additional COT resources. Further, a single bit indicator indicating the request 422 for additional COT resources may reduce network overhead as compared to reporting the status of each LBT 326 performed to the BS 105 for each of the slots i, i+1, i+2, etc. and/or sub-slots scheduled in the original COT resources.

In some aspects, the UE 115 may transmit the request 422 for additional COT resources via the PUCCH 412 in a licensed frequency band. In this case, the UE 115 may not perform an LBT 326 for gaining channel access and a single transmission of the PUCCH 412 in the licensed band may be used. In some aspects, the UE 115 may transmit the request 422 for additional COT resources via the PUCCH 412 in an unlicensed frequency band (e.g., a shared frequency band). In this case, the BS 105 may reserve resources (e.g., multiple contiguous or non-contiguous slots and/or sub-slots, a single slot and/or sub-slot, or other suitable resources) for the PUCCH 412 transmission. In this regard, the BS 105 may transmit an indication of the PUCCH 412 resources in an RRC message and/or a DCI_3 message. The UE 115 may perform one or more LBTs 326 in the PUCCH window 410. The UE 115 may transmit the request 422 for additional COT resources via the PUCCH 412 in the PUCCH window 410 after a successful LBT 326. The PUCCH 412 resources may include periodic resources. In some aspects, the UE 115 may fail to perform a successful LBT 326 during the PUCCH window 410. In this case, the UE 115 may wait for the next PUCCH window 410 and attempt one or more LBTs 326 in the PUCCH window 410. The periodic PUCCH window 410 may have a periodicity according to the COT grant request period 404.

Figure 5:
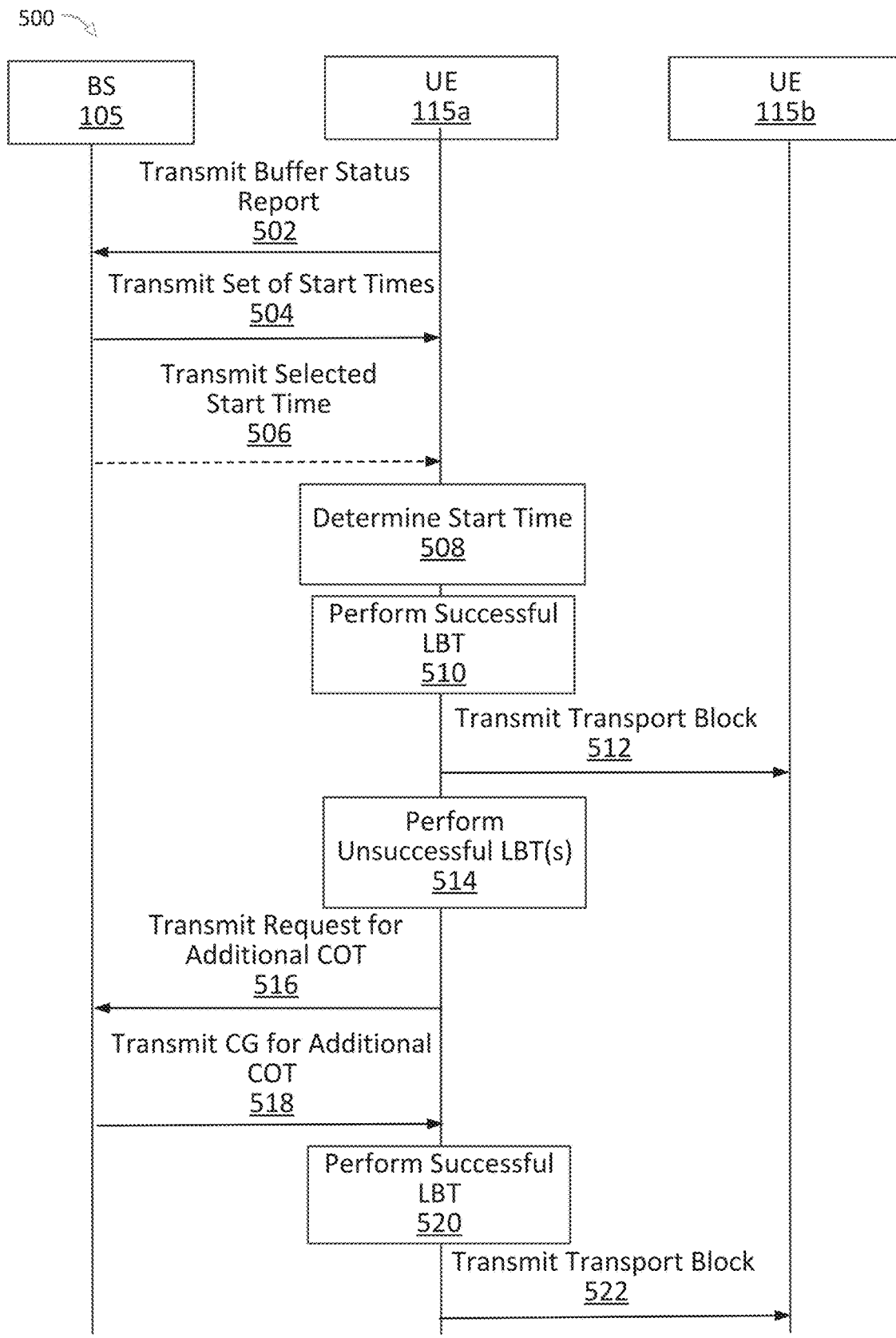
FIG. 5 is a signaling diagram of a communication method according to some aspects of the present disclosure.

FIG. 5 is a signaling diagram of a communication method according to some aspects of the present disclosure. At action 502, the method 500 includes the UE 115a transmitting a BSR to the BS 105. In this regard, the UE 115a may transmit the BSR to the BS 105 in a physical uplink control channel (PUCCH) and/or a physical uplink shared channel (PUSCH). In some instances, the UE 115a may indicate the amount of data the UE 115a intends to transmit to the UE 115b in the BSR.

At action 504, the method 500 includes the BS 105 transmitting a set of start time to the UE 115a. In this regard, the BS 105 may transmit the indicator to the UE 115a indicating the set of start times associated with the TXOP in a physical downlink control channel (PDCCH), a physical broadcast channel (PBCH), a physical downlink shared channel (PDSCH), or other suitable channel. In some aspects, the BS 105 may transmit the indicator in downlink control information (e.g., a DCI3_x or other DCI communication format).

At action 506, the method 500 additionally or alternatively, includes the BS 105 transmitting the selected start time to the UE 115a. In this regard, the BS 105 may (optionally) transmit the selected start time to the UE 115a in a physical downlink control channel (PDCCH), a physical broadcast channel (PBCH), a physical downlink shared channel (PDSCH), or other suitable channel. In some aspects, the BS 105 may transmit the selected start time in downlink control information (e.g., a DCI3_x or other DCI communication format).

At action 508, the method 500 includes the UE 115a determining a start time. In some aspects, the UE 115a may receive the indication of the start time from the BS 105 in downlink control information (e.g., a DCI3_x or other DCI communication format). Additionally or alternatively, the BS 105 may transmit a subset of the set of start times to the UE 115a and indicate which start time of the subset of start times the UE 115a may use. For example, the BS 105 may transmit a code point in a DCI_3x message that indicates which start time of the subset of the set of start times the UE 115a may use. Additionally or alternatively, the BS 105 may transmit the subset of start times to the UE 115a and the UE 115a may select (e.g., randomly and/or based on a pattern or other formula) one of the start times of the subset of the set of start times.

At action 510, the method 500 includes the UE 115a performing a successful LBT. The UE 115a may perform a successful LBT in an unlicensed frequency band within an LBT window.

At action 512, the method 500 includes the UE 115a transmitting a TB to the UE 115b. The UE 115a may transmit a TB after the selected start time of the set of start times based on the LBT procedure being successful at action 510. If the LBT procedure is successful, then the UE 115a may transmit one or more TB to the UE 115b. In this regard, the UE 115a may transmit the TB(s) to the UE 115b in a physical sidelink shared channel (PSSCH).

At action 514, the method 500 includes the UE 115a performing an unsuccessful LBT. The UE 115a may perform one or more unsuccessful LBTs in an unlicensed frequency band within an LBT window. The UE 115a may perform an unsuccessful LBT by sensing the energy in the channel and determining the sensed energy is above a threshold. In response to determining the LBT was unsuccessful, the UE 115a may wait a period of time (e.g., a random back-off time period, a pre-configured back-off time period) and perform another LBT after waiting the period of time. The sequence of determining an unsuccessful LBT, waiting the period of time, and performing another LBT may be performed multiple times during the LBT window.

At action 516, the method 500 includes the UE 115a transmitting a request for additional COT resources. In this regard the UE 115a may transmit the request for additional COT resources via a PUCCH. If all of the LBT attempts at action 514 were unsuccessful, the UE 115a may transmit the request for additional COT resources in order for the UE to transmit TBs to the UE 115b and/or to retransmit TBs to the UE 115b that were not decoded successfully by the UE 115b.

At action 518, the method 500 includes the BS 105 transmitting a configured grant for additional COT resources requested at action 516. In this regard, the BS 105 may transmit the configured grant for additional COT resources to the UE 115a in a physical downlink control channel (PDCCH), a physical broadcast channel (PBCH), a physical downlink shared channel (PDSCH), or other suitable channel. In some aspects, the BS 105 may transmit the configured grant for additional COT resources in downlink control information (e.g., a DCI3_x or other DCI communication format).

At action 520, the method 500 includes the UE 1 5a performing a successful LBT. The UE 115a may perform a successful LBT in an unlicensed frequency band within the additional COT resources granted at action 518.

At action 522, the method 500 includes the UE 115a transmitting one or more TBs to the UE 115b. The UE 115a may transmit the TB after the selected start time of the set of start times based on the LBT procedure being successful at action 510. If the LBT procedure is successful, then the UE 115a may transmit one or more TBs to the UE 115b. In this regard, the UE 115a may transmit the TB(s) to the UE 115b in a physical sidelink shared channel (PSSCH). The TBs transmitted to the UE 115b may include a retransmitting of TBs that were unsuccessfully decoded by the UE 115b at action 512. In some aspects, the TBs transmitted to the UE 115b may include TBs remaining in a transmit buffer of the UE 115a after transmitting TBs to the UE 115b at action 512.

Figure 6:
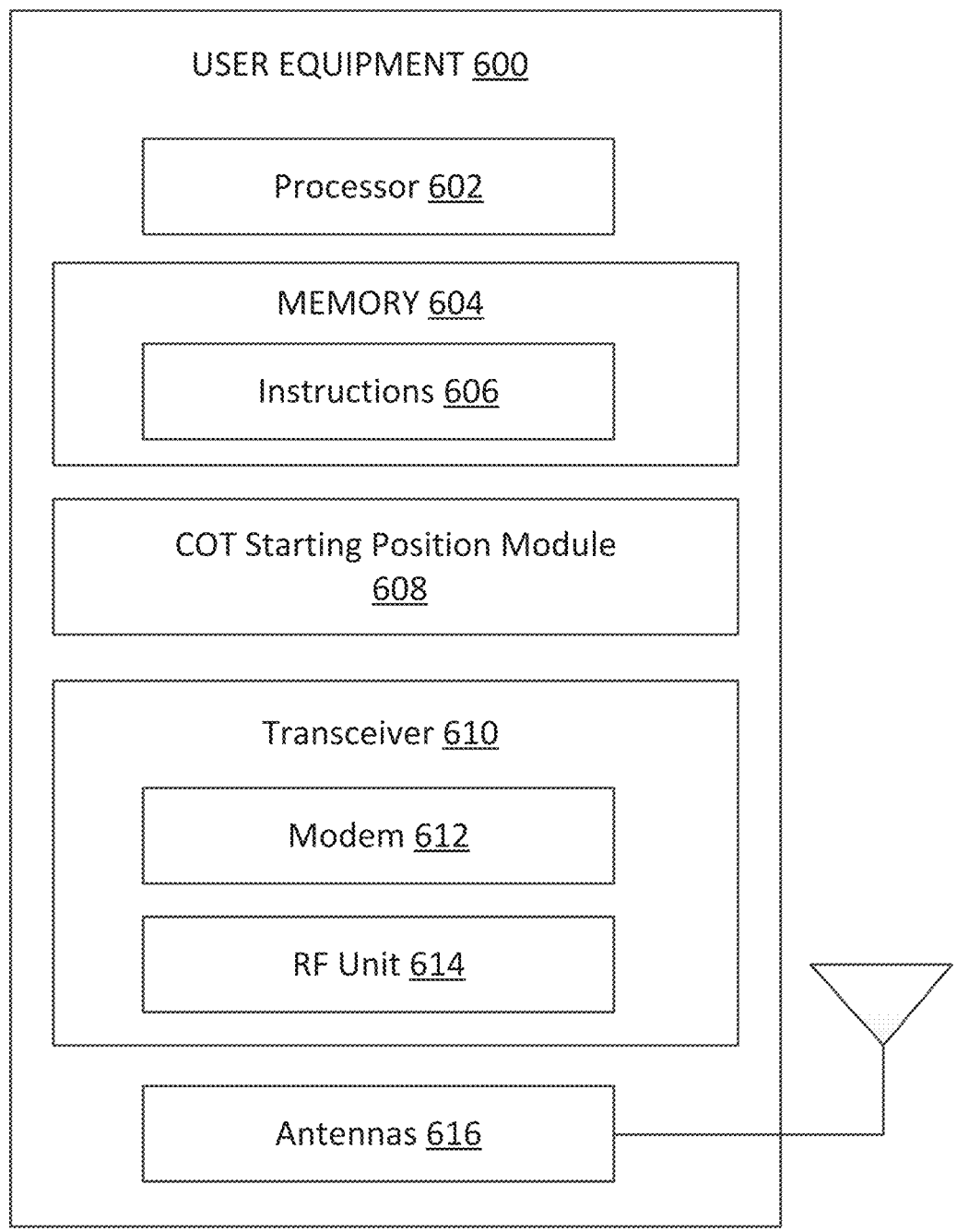
FIG. 6 is a block diagram of an exemplary user equipment (UE) according to some aspects of the present disclosure.

FIG. 6 is a block diagram of an exemplary UE 600 according to some aspects of the present disclosure. The UE 600 may be the UE 115 in the network 100 or 200 as discussed above. As shown, the UE 600 may include a processor 602, a memory 604, a COT starting position module 608, a transceiver 610 including a modem subsystem 612 and a radio frequency (RF) unit 614, and one or more antennas 616. These elements may be coupled with each other and in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 604 includes a non-transitory computer-readable medium. The memory 604 may store instructions 606. The instructions 606 may include instructions that, when executed by the processor 602, cause the processor 602 to perform the operations described herein with reference to the UEs 115 in connection with aspects of the present disclosure, for example, aspects of FIGS. 2-5 and 8-9. Instructions 606 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The COT starting position module 608 may be implemented via hardware, software, or combinations thereof. For example, the COT starting position module 608 may be implemented as a processor, circuit, and/or instructions 606 stored in the memory 604 and executed by the processor 602.

In some aspects, the COT starting position module 608 may be configured to receive an indicator indicating a set of start times associated with a transmission opportunity from a base station (BS). The COT starting position module 608 may be further configured to perform a listen-before-talk (LBT) procedure for the transmission opportunity. The COT starting position module 608 may be further configured to transmit a communication to a second UE starting at a selected start time of the set of start times based on the LBT procedure being successful.

As shown, the transceiver 610 may include the modem subsystem 612 and the RF unit 614. The transceiver 610 can be configured to communicate bi-directionally with other devices, such as the BSs 105 and/or the UEs 115. The modem subsystem 612 may be configured to modulate and/or encode the data from the memory 604 and the COT starting position module 608 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together to enable the UE 600 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The antennas 616 may include multiple antennas of similar or different designs in order to sustain multiple transmission links. The RF unit 614 may configure the antennas 616.

In some instances, the UE 600 can include multiple transceivers 610 implementing different RATs (e.g., NR and LTE). In some instances, the UE 600 can include a single transceiver 610 implementing multiple RATs (e.g., NR and LTE). In some instances, the transceiver 610 can include various components, where different combinations of components can implement RATs.

In some aspects, the processor 602 may be coupled to the memory 604, the COT starting position module 608, and/or the transceiver 610. The processor 602 and may execute operating system (OS) code stored in the memory 604 in order to control and/or coordinate operations of the COT starting position module 608 and/or the transceiver 610. In some aspects, the processor 602 may be implemented as part of the COT starting position module 608.

Figure 7:
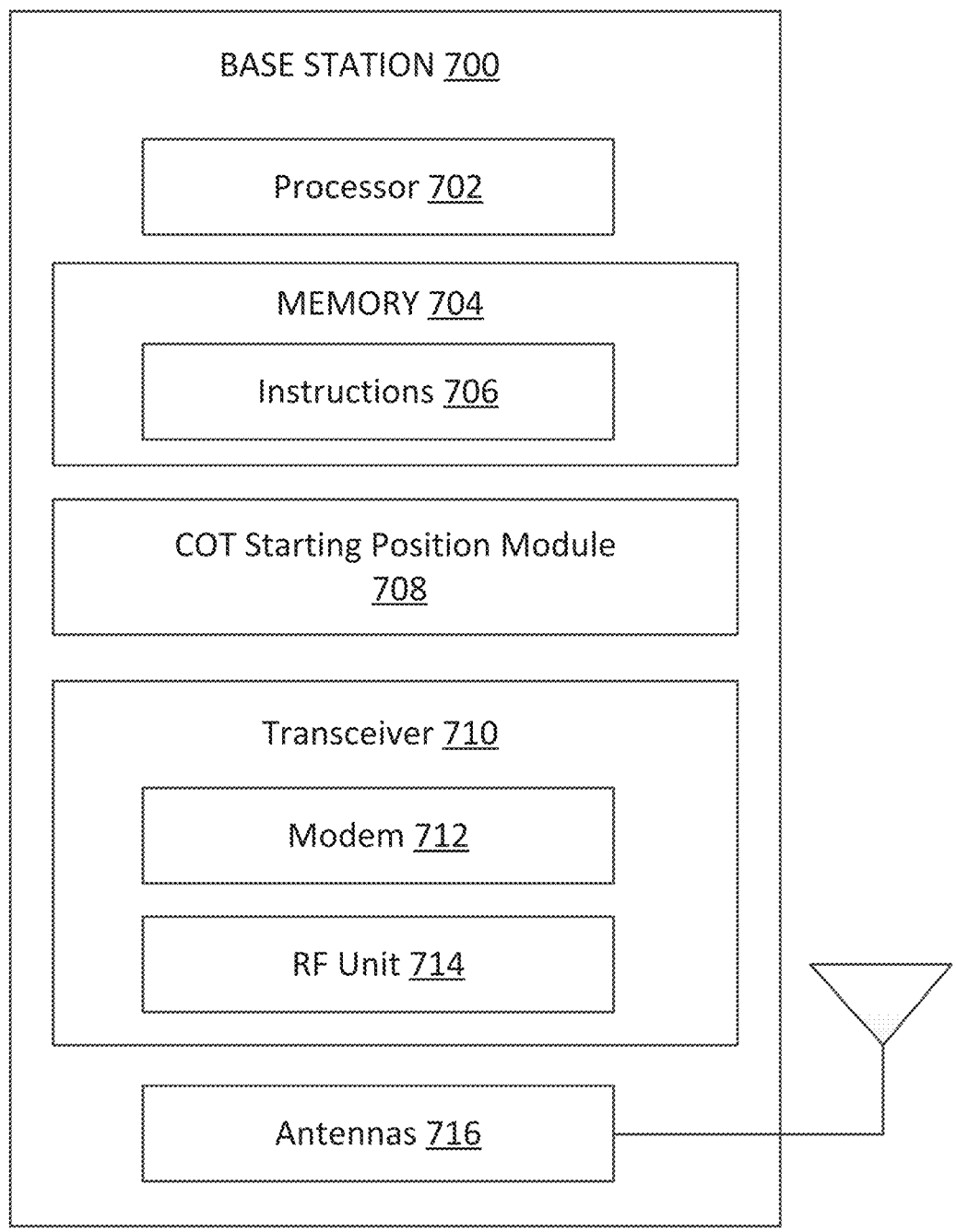
FIG. 7 is a block diagram of an exemplary base station (BS) according to some aspects of the present disclosure.

FIG. 7 is a block diagram of an exemplary BS 700 according to some aspects of the present disclosure. The BS 700 may be a BS 105 as discussed above. As shown, the BS 700 may include a processor 702, a memory 704, a COT starting position module 708, a transceiver 710 including a modem subsystem 712 and a RF unit 714, and one or more antennas 716. These elements may be coupled with each other and in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 2-5 and 8-9. Instructions 706 may also be referred to as code, which may be interpreted broadly to include any type of computer-readable statement(s).

The COT starting position module 708 may be implemented via hardware, software, or combinations thereof. For example, the COT starting position module 708 may be implemented as a processor, circuit, and/or instructions 706 stored in the memory 704 and executed by the processor 702.

The COT starting position module 708 may be used for various aspects of the present disclosure, for example, aspects of FIGS. 2-5 and 8-9. In some aspects, the COT starting position module 708 may be configured to transmit an indicator to a first user equipment (UE) indicating a set of start times associated with a transmission opportunity. The COT starting position module 708 may be further configured to select a start time from the set of start times based on a priority level associated with the first UE. The COT starting position module 708 may be further configured to transmit an indication of the selected start time to the first UE.

Additionally or alternatively, the COT starting position module 708 can be implemented in any combination of hardware and software, and may, in some implementations, involve, for example, processor 702, memory 704, instructions 706, transceiver 710, and/or modem 712.

As shown, the transceiver 710 may include the modem subsystem 712 and the RF unit 714. The transceiver 710 can be configured to communicate bi-directionally with other devices, such as the UEs 115 and/or 600. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or UE 600. The RF unit 714 may be further configured to perform analog beamforming in conjunction with the digital beamforming. Although shown as integrated together in transceiver 710, the modem subsystem 712 and/or the RF unit 714 may be separate devices that are coupled together at the BS 700 to enable the BS 700 to communicate with other devices.

The RF unit 714 may provide the modulated and/or processed data, e.g. data packets (or, more generally, data messages that may contain one or more data packets and other information), to the antennas 716 for transmission to one or more other devices. This may include, for example, a configuration indicating a plurality of sub-slots within a slot according to aspects of the present disclosure. The antennas 716 may further receive data messages transmitted from other devices and provide the received data messages for processing and/or demodulation at the transceiver 710. The antennas 716 may include multiple antennas of similar or different designs in order to sustain multiple transmission links.

In some instances, the BS 700 can include multiple transceivers 710 implementing different RATs (e.g., NR and LTE). In some instances, the BS 700 can include a single transceiver 710 implementing multiple RATs (e.g., NR and LTE). In some instances, the transceiver 710 can include various components, where different combinations of components can implement RATs.

In some aspects, the processor 702 may be coupled to the memory 704, the COT starting position module 708, and/or the transceiver 710. The processor 702 may execute OS code stored in the memory 704 to control and/or coordinate operations of the COT starting position module 708, and/or the transceiver 710. In some aspects, the processor 702 may be implemented as part of the COT starting position module 708. In some aspects, the processor 702 is configured to transmit via the transceiver 710, to a UE, an indicator indicating a configuration of sub-slots within a slot.

Figure 8:
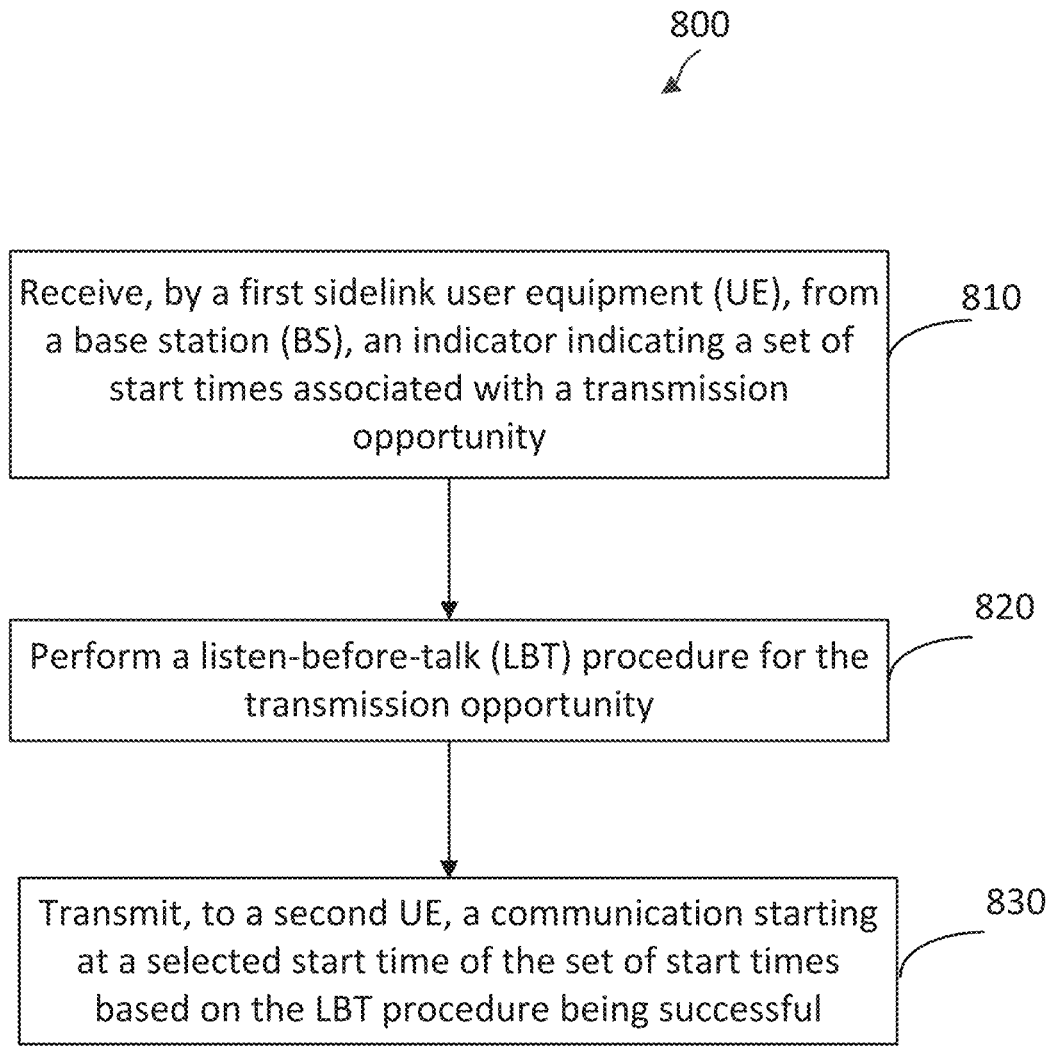
FIG. 8 is a flow diagram of a communication method according to some aspects of the present disclosure.

FIG. 8 is a flow diagram of a communication method 800 according to some aspects of the present disclosure. Aspects of the method 800 can be executed by a computing device (e.g., a processor, processing circuit, and/or other suitable component) of a wireless communication device or other suitable means for performing the actions. For example, a wireless communication device, such as the UE 115 or the UE 600, may utilize one or more components, such as the processor 602, the memory 604, the COT starting position module 608, the transceiver 610, the modem 612, and the one or more antennas 616, to execute aspects of method 800. The method 800 may employ similar mechanisms as in the networks 100 and 200 and the aspects and actions described with respect to FIGS. 2-5. As illustrated, the method 800 includes a number of enumerated actions, but the method 800 may include additional actions before, after, and in between the enumerated actions. In some aspects, one or more of the enumerated actions may be omitted or performed in a different order.

At action 810, the method 800 includes a UE (e.g., the UE 115 or the UE 600) receiving an indicator indicating a set of start times associated with a transmission opportunity (TXOP) from a base station (BS). In some aspects, the UE may operate in sidelink mode 1 in which the UE is in communication with the BS in order to receive the indicator from the BS. In this regard, the UE may receive the indicator indicating the set of start times associated with the TXOP in a physical downlink control channel (PDCCH), a physical broadcast channel (PBCH), a physical downlink shared channel (PDSCH), or other suitable channel. In some aspects, the UE may receive the indicator in downlink control information (e.g., a DCI3_x or other DCI communication format). The UE may be a sidelink UE operating in a licensed and/or unlicensed frequency band. The set of start times may indicate a time when the UE may begin to transmit a communication (e.g., a transport block(TB)) to a second UE after the UE performs a listen-before-talk (LBT) procedure that passes.

In some aspects, the UE may transmit the TB within a COT duration. The COT duration may be a number of slots and/or sub-slots allocated to the UE for transmitting the TB(s). The COT duration may be based on an amount of data (e.g., in TB(s)) the UE needs to transmit to the second UE. A larger amount of data (e.g., more TB(s)) may require a longer COT duration as compared to a smaller amount of data (e.g., less TB(s)). In some instances, the UE may indicate the amount of data to be transmitted in a buffer status report (BSR). In this regard, the UE may transmit the BSR to the BS in a physical uplink control channel (PUCCH) and/or a physical uplink shared channel (PUSCH). In some aspects, the set of start times may be absolute start times (e.g., based on a global navigation satellite system (GNSS or GPS) timing signal, a real time clock or timer) or relative start times (e.g., relative to a reference time or occurrence). For example, in some instances each start time of the set of start times may be relative to a slot boundary and/or a sub-slot boundary. The set of start times may include start times before and/or after the slot boundary and/or the sub-slot boundary. For example, the set of start times may include a set of start times prior to a slot boundary. In some aspects, each start time of the set of start times may be offset from the slot boundary, sub-slot boundary, and/or other reference point by an integer multiple of a time period (e.g., 9 microseconds or other suitable amount of time). For example, the set of start times may include start times at 0×9 microseconds (e.g., the slot boundary), 1×9 microseconds, 2×9 microseconds, etc. before (and/or after) the slot boundary, sub-slot boundary, and/or other reference point. In some aspects, the indicator indicating the set of start times may include a set of integer multiples of the time period.

In some aspects, the BS may control which UEs in the network (e.g., the network 100 or 200) gain access to the TXOP based on start time. For example, the BS may assign a start time (or a set of start times) to one or more UEs that is earlier than a start time (or a set of start times) assigned to one or more other UEs. In this fashion, the UE(s) with the earlier start time(s) may begin to transmit a communication earlier than the other UE(s). For example, a first UE may have a start time earlier than a second UE. The first UE may perform a successful LBT and begin transmission of a communication (e.g., a TB). The second UE may have a start time that coincides with the transmission of the TB by the first UE, which may cause the LBT of the second UE to be unsuccessful and prevent the second UE from transmitting during the TXOP while the first UE is transmitting/occupying a portion of the TXOP. The second UE may perform an LBT after the first UE has finished transmitting/occupying the portion of the TXOP and may transmit a communication (e.g., a TB) based on a successful LBT during another portion of the TXOP (or a subsequent TXOP). In some aspects, the first UE may not successfully perform the LBT due to interference in the transmission channel (e.g., interference from other transmitters). However, the second UE may be spatially separated from the first UE and not subject to the same level of interference. In this case, the second UE with the later start time may gain access to the COT and transmit a communication based on a successful LBT. In this manner, the BS may increase the spatial diversity of the network and increase the overall performance of the network through the use of start times.

The BS may prioritize which UEs may transmit based on controlling the start times. In some aspects, the BS may determine the start time or the set of start times based on a packet delay budget associated with the communication that the UE intends to transmit.

In some aspects, the BS may determine a start time for the UE and transmit an indication of the start time to the UE. In some aspects, the UE may receive the indication of the start time from the BS in downlink control information (e.g., a DCI3_x or other DCI communication format). Additionally or alternatively, the BS may transmit a subset of the set of start times to the UE and indicate which start time of the subset of start times the UE may use. For example, the BS may transmit a code point in a DCI_3x message that indicates which start time of the subset of the set of start times the UE may use. Additionally or alternatively, the BS may transmit the subset of start times to the UE and the UE may select (e.g., randomly and/or based on a pattern or other formula) one of the start times of the subset of the set of start times.

At action 820, the method 800 includes the UE performing a listen-before-talk (LBT) procedure for the transmission opportunity. In some aspects, the UE may receive an LBT configuration. In this regard, the UE may receive the LBT configuration from the BS via a physical downlink control channel (PDCCH), a physical broadcast channel (PBCH), a physical downlink shared channel (PDSCH), or other suitable channel. The LBT configuration may include a maximum COT duration. The maximum COT duration may be based on a buffer status report (BSR) received by the BS from the UE. The LBT configuration may further indicate resources including time/frequency resources signaled via a DCI_3x message or other suitable message. The time resources may be indicated in a time domain resource allocation (TDRA). The frequency resources may be indicated in a frequency domain resource allocation (FDRA). The LBT configuration may include a start and an end associated with the COT duration. For example, the LBT configuration may include an indicator indicating a starting slot and/or starting sub-slot associated with the COT duration. The configuration may include an indicator indicating an ending slot and/or ending sub-slot associated with the COT duration. In some instances, the ending slot and/or ending sub-slot associated with the COT duration may be determined by the UE based on the starting slot and/or starting sub-slot and the maximum COT duration. In some instances, the start and/or end indicators of the COT duration may include slot indexes and/or sub-slot indexes. The LBT configuration may include the type of LBT (e.g., a frame-based equipment (FBE)-based LBT and/or a load-based equipment (LBE)-based LBT), the category of LBT (e.g., CAT2-LBT and/or CAT4-LBT), and/or at least one direction (e.g., a beam direction) associated with the LBT.

In some aspects, the UE may perform the LBT within an LBT window time period indicated by the LBT configuration. The UE may perform the LBT for a COT in a shared radio frequency band during the LBT window. In this regard, the UE may perform the LBT for the COT in at least one frequency range in the shared radio frequency band. In some aspects, the at least one frequency range in the shared radio frequency band includes a plurality of contiguous frequencies in the shared radio frequency band. For example, the contiguous frequencies may include multiple subchannels that are contiguous over a range of frequencies. The LBT configuration may include an indicator (e.g., a bitmap) indicating which frequencies the UE may perform the LBT in the shared radio frequency band. In some aspects, the BS may configure multiple UEs with the same and/or different frequency ranges to perform an LBT. In some aspects, the frequency ranges for each of the UEs may be contiguous. In some aspects, the frequency ranges for the UEs may be interleaved with one another. For example, the UE may be configured with frequency ranges having even indexes and another UE may be configured with frequency ranges having odd indexes. However, any type or arrangement of interleaving of frequencies may be utilized. In some aspects, the BS may configure (e.g., assign) overlapping time and/or frequency resources to multiple UEs. Each of the UEs assigned with the overlapping time and/or frequency resources may compete for the COT by performing an LBT in the overlapping resources based on one or more start times assigned to the UE. The UE may first sense the communications channel during the LBT window to determine if there are other devices using the channel prior to any transmission by the UE. In some aspects, the channel sensing procedure may rely on detecting energy levels on one or multiple sub-bands of the shared radio frequency band. The UE may perform the LBT in one or more beam direction(s) (e.g., 1, 2, 4, 8, 16, or more beam directions). In some instances, the beam direction(s) may be towards another sidelink UE that the UE intends to communicate with. The UE may configure its receiver to the specific beam direction and perform the LBT in the specific beam direction.

In some aspects, the UE may perform an unsuccessful LBT by sensing the energy in the channel and determining the sensed energy is above a threshold. In response to determining the LBT was unsuccessful, the UE may wait a period of time (e.g., a random back-off time period, a pre-configured back-off time period) and perform another LBT after waiting the period of time. In some aspects, the UE may wait a period of time before performing another LBT based on the next available start time. The sequence of determining an unsuccessful LBT, waiting the period of time, and performing another LBT may be performed multiple times during the LBT window.

At action 830, the method 800 includes the UE transmitting a communication (e.g., a transport block (TB)) to a second UE starting at a selected start time of the set of start times based on the LBT procedure being successful. If the LBT procedure at action 820 is successful, then the UE may transmit one or more TB to the second UE. In this regard, the UE may transmit the TB(s) to the second UE in a physical sidelink shared channel (PSSCH). The UE may transmit the TB(s) to the second UE in at least one beam direction that has successfully cleared the LBT. In some aspects, the UE may transmit the one or more TBs based on the LBT configuration received from the BS. In some aspects, the UE and the second UE may execute a HARQ process for the potential retransmission of the TB.

In some aspects, the UE may not perform a successful LBT during the LBT window. In this case, the UE may transmit a request to the BS for additional COT resources. In some aspects, the UE may perform a successful LBT and transmit TB(s) during the COT, but may not have been provided enough resources to complete transmission of all the TBs the UE intends to transmit. In this case, the UE may transmit a request to the BS for additional COT resources to finish transmitting the TBs in the UE's buffer. In some aspects, the UE may perform a successful LBT and transmit TB(s) during the COT, but the receiving UE may not successfully decode the TB(s). In this case, the UE may transmit a request to the BS for additional COT resources to retransmit the TBs that were not successfully decoded by the second (e.g., receiving) UE.

The UE may transmit the request for additional COT resources via a physical uplink control channel (PUCCH). In this regard, the BS may configure periodic resources for the UE to transmit the request for additional COT resources. For example, the BS may reserve periodic time and frequency resources for the UE to transmit the request for additional COT resources via the PUCCH. In this regard, the BS may transmit an indication of the periodic PUCCH resources in an RRC message and/or a DCI_3 message. In response to receiving the request for additional COT resources, the BS may configure the UE for the additional resources for sidelink communications. For example, the BS may repeat action 810 described above. In some instances, the actions 810, 820, and 830 may be repeated until the UE has successfully transmitted all of the TBs the UE has scheduled to transmit in its buffer. In some instances, the BS may provide the UE with the same amount of resources as in the original resource allocation. For example, prior to executing action 810, the UE may transmit a buffer status report (BSR) indicating an amount of TBs the UE intends to transmit (e.g., the amount of TBs the UE has scheduled to transmit in its buffer). The BS may configure the resources allocated to the UE based on the BSR. If the UE performs a successful LBT at action 820, but fails to transmit all of its TBs at 830, or transmits one or more TBs that are not successfully decoded by the receiving UE, then the BS may configure the additional resources based on the previously transmitted BSR. In some aspects, the BS may configure the additional resources based on an updated BSR that reflects the results of actions 820 and 830. For example, the BS may transmit a grant for the additional COT resources having the same start time and the same COT duration as the previous grant. In some aspects, the BS may transmit a grant for the additional COT resources based on an amount of data left to be transmitted by the UE based on an updated BSR. In some aspects, the BS may transmit a grant for the additional COT resources based on the number of retransmissions required by the UE. In some aspects, the UE may transmit to the BS a request for additional COT resources indicating the amount of resources requested by the UE. In response to the request, the BS may transmit the additional COT grant indicating the amount of resources requested by the UE.

In some aspects, the PUCCH resources assigned by the BS for requesting additional COT resources may be resources previously assigned to the UE for ACK/NACK feedback to the BS. For example, the indicator transmitted by the UE via the PUCCH indicating the request for additional COT resources may be a code point in the PUCCH. In this regard, the code point may be a single bit indicating the request. For example, if the code point has a value of '0' the UE does not request additional COT resources. If the code point has a value of '1' the UE requests additional COT resources. Using a single bit code point for indicating the request for additional COT resources may reduce network overhead compared to using a multi-bit code point, a medium access control-control element (MAC-CE) message, or a scheduling request for requesting the additional COT resources. Further, a single bit indicator indicating the request for additional COT resources may reduce network overhead as compared to reporting the status of each LBT performed at action 820 to the BS for each of the slots and/or sub-slots scheduled in the original COT resources.

In some aspects, the UE may transmit the request for additional COT resources via the PUCCH in a licensed frequency band. In this case, the UE may not perform an LBT for gaining channel access and a single transmission of the PUCCH in the licensed band may be used. In some aspects, the UE may transmit the request for additional COT resources via the PUCCH in an unlicensed frequency band (e.g., a shared frequency band). In this case, the BS may reserve resources (e.g., multiple contiguous or non-contiguous slots and/or sub-slots, a single slot and/or sub-slot, or other suitable resources) for the PUCCH transmission. In this regard, the BS may transmit an indication of the PUCCH resources in an RRC message and/or a DCI_3 message. The UE may perform one or more LBTs in the multiple contiguous slots and/or sub-slots. The UE may transmit the request for additional COT resources via the PUCCH in a slot or sub-slot after a successful LBT. In some aspects, the PUCCH resources may include periodic resources. The UE may fail to perform a successful LBT during the resources reserved for the PUCCH. In this case, the UE may wait for the next period of PUCCH resources and attempt one or more LBTs in the PUCCH resources.

Figure 9:
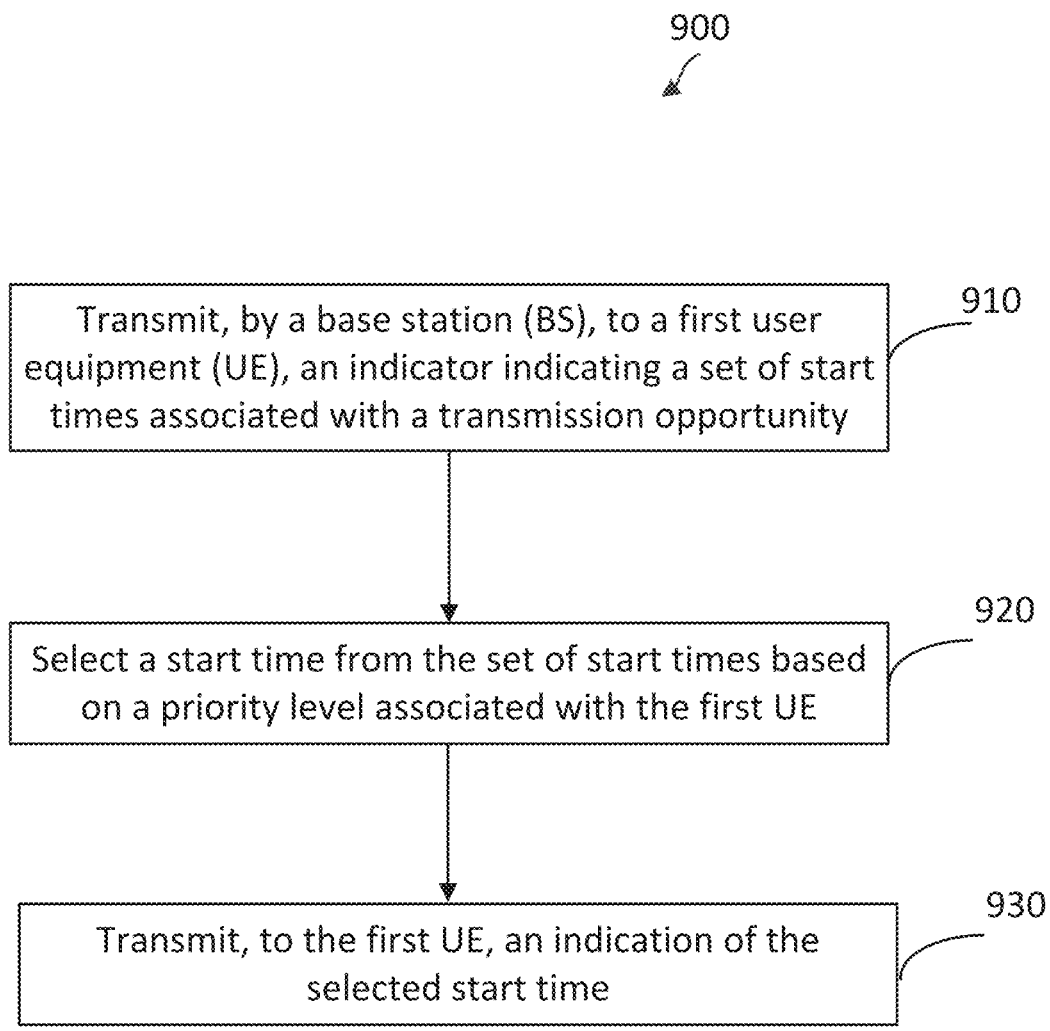
FIG. 9 is a flow diagram of a communication method according to some aspects of the present disclosure.

FIG. 9 is a flow diagram of a communication method 900 according to some aspects of the present disclosure. Aspects of the method 900 can be executed by a computing device (e.g., a processor, processing circuit, and/or other suitable component) of a wireless communication device or other suitable means for performing the actions. For example, a wireless communication device, such as the BS 105 or the BS 700, may utilize one or more components, such as the processor 702, the memory 704, the COT starting position module 708, the transceiver 710, the modem 712, and the one or more antennas 716, to execute aspects of method 900. The method 900 may employ similar mechanisms as in the networks 100 and 200 and the aspects and actions described with respect to FIGS. 2-5. As illustrated, the method 900 includes a number of enumerated actions, but the method 900 may include additional actions before, after, and in between the enumerated actions. In some aspects, one or more of the enumerated actions may be omitted or performed in a different order.

At action 910, the method 900 includes a BS (e.g., BS 105 or the BS 700) transmitting an indicator indicating a set of start times associated with a transmission opportunity (TXOP) to a UE (e.g., the UE 115 or the UE 600). In some aspects, the BS may operate in sidelink mode 1 in which the BS is in communication with the UE in order to transmit the indicator to the UE. In this regard, the BS may transmit the indicator indicating the set of start times associated with the TXOP in a physical downlink control channel (PDCCH), a physical broadcast channel (PBCH), a physical downlink shared channel (PDSCH), or other suitable channel. In some aspects, the BS may transmit the indicator in downlink control information (e.g., a DCI3_x or other DCI communication format). The UE may be a sidelink UE operating in a licensed and/or unlicensed frequency band. The set of start times may indicate a time when the UE may begin to transmit a communication (e.g., a transport block(TB)) to a second UE after the UE performs a listen-before-talk (LBT) procedure that passes.

In some aspects, the UE may transmit the TB within a COT duration. The COT duration may be a number of slots and/or sub-slots allocated to the UE for transmitting the TB(s). The COT duration may be based on an amount of data the UE needs to transmit in TB(s) to the second UE. A larger amount of data may require a longer COT duration as compared to a smaller amount of data. In some instances, the UE may indicate the amount of data to be transmitted in a buffer status report (BSR). In this regard, the BS may receive the BSR from the UE in a physical uplink control channel (PUCCH) and/or a physical uplink shared channel (PUSCH). In some aspects, the set of start times may be absolute start times (e.g., based on a global navigation satellite system (GNSS or GPS) timing signal, a real time clock or timer) or relative start times (e.g., relative to a reference time or occurrence). For example, in some instances each start time of the set of start times may be relative to a slot boundary and/or a sub-slot boundary. The set of start times may include start times before and/or after the slot boundary and/or the sub-slot boundary. For example, the set of start times may include a set of start times prior to a slot boundary. In some aspects, each start time of the set of start times may be offset from the slot boundary, sub-slot boundary, and/or other reference point by an integer multiple of a time period (e.g., 9 microseconds or other suitable amount of time). For example, the set of start times may include start times at 0×9 microseconds (e.g., the slot boundary), 1×9 microseconds, 2×9 microseconds, etc. before (and/or after) the slot boundary, sub-slot boundary, and/or other reference point. In some aspects, the indicator indicating the set of start times may include a set of integer multiples of the time period.

In some aspects, the BS may control which UEs in the network (e.g., the network 100 or 200) gain access to the TXOP based on start time. For example, the BS may assign a start time (or a set of start times) to one or more UEs that is earlier than a start time (or a set of start times) assigned to one or more other UEs. In this fashion, the UE(s) with the earlier start time(s) may begin to transmit a communication earlier than the other UE(s). For example, a first UE may have a start time earlier than a second UE. The first UE may perform a successful LBT and begin transmission of a communication (e.g., a TB). The second UE may have a start time that coincides with the transmission of the TB by the first UE, which may cause the LBT of the second UE to be unsuccessful and prevent the second UE from transmitting during the TXOP while the first UE is transmitting/occupying a portion of the TXOP. The second UE may perform an LBT after the first UE has finished transmitting/occupying the portion of the TXOP and may transmit a communication (e.g., a TB) based on a successful LBT during another portion of the TXOP (or a subsequent TXOP). In some aspects, the first UE may not successfully perform the LBT due to interference in the transmission channel (e.g., interference from other transmitters). However, the second UE may be spatially separated from the first UE and not subject to the same level of interference. In this case, the second UE with the later start time may gain access to the COT and transmit a communication based on a successful LBT. In this manner, the BS may increase the spatial diversity of the network and increase the overall performance of the network through the use of start times.

At action 920, the method 900 includes the BS selecting a start time form the set of start times based on a priority level associated with the UE. The BS may prioritize which UEs may transmit based on controlling the start times. In some aspects, the BS may determine the start time or the set of start times based on a packet delay budget associated with the communication that the UE intends to transmit.

In some aspects, the BS may determine a start time for the UE and transmit an indication of the start time to the UE. In some aspects, the BS may transmit the indication of the start time to the UE in downlink control information (e.g., a DCI3_x or other DCI communication format). Additionally or alternatively, the BS may transmit a subset of the set of start times to the UE and indicate which start time of the subset of start times the UE may use. For example, the BS may transmit a code point in a DCI_3x message that indicates which start time of the subset of the set of start times the UE may use. Additionally or alternatively, the BS may transmit the subset of start times to the UE and the UE may select (e.g., randomly and/or based on a pattern or other formula) one of the start times of the subset of the set of start times.

The UE performing a listen-before-talk (LBT) procedure for the transmission opportunity. In some aspects, the UE may receive an LBT configuration. In this regard, the BS may transmit the LBT configuration to the UE via a physical downlink control channel (PDCCH), a physical broadcast channel (PBCH), a physical downlink shared channel (PDSCH), or other suitable channel. The LBT configuration may include a maximum COT duration. The maximum COT duration may be based on a buffer status report (BSR) received by the BS from the UE. The LBT configuration may further indicate resources including time/frequency resources signaled via a DCI_3x message or other suitable message. The time resources may be indicated in a time domain resource allocation (TDRA). The frequency resources may be indicated in a frequency domain resource allocation (FDRA). The LBT configuration may include a start and an end associated with the COT duration. For example, the LBT configuration may include an indicator indicating a starting slot and/or starting sub-slot associated with the COT duration. The configuration may include an indicator indicating an ending slot and/or ending sub-slot associated with the COT duration. In some instances, the ending slot and/or ending sub-slot associated with the COT duration may be determined by the UE based on the starting slot and/or starting sub-slot and the maximum COT duration. In some instances, the start and/or end indicators of the COT duration may include slot indexes and/or sub-slot indexes. The LBT configuration may include the type of LBT (e.g., a frame-based equipment (FBE)-based LBT and/or a load-based equipment (LBE)-based LBT), the category of LBT (e.g., CAT2-LBT and/or CAT4-LBT), and/or at least one direction (e.g., a beam direction) associated with the LBT.

In some aspects, the UE may perform the LBT within an LBT window time period indicated by the LBT configuration. The UE may perform the LBT for a COT in a shared radio frequency band during the LBT window. In this regard, the UE may perform the LBT for the COT in at least one frequency range in the shared radio frequency band. In some aspects, the at least one frequency range in the shared radio frequency band includes a plurality of contiguous frequencies in the shared radio frequency band. For example, the contiguous frequencies may include multiple subchannels that are contiguous over a range of frequencies. The LBT configuration may include an indicator (e.g., a bitmap) indicating which frequencies the UE may perform the LBT in the shared radio frequency band. In some aspects, the BS may configure multiple UEs with the same and/or different frequency ranges to perform an LBT. In some aspects, the frequency ranges for each of the UEs may be contiguous. In some aspects, the frequency ranges for the UEs may be interleaved with one another. For example, the UE may be configured with frequency ranges having even indexes and another UE may be configured with frequency ranges having odd indexes. However, any type or arrangement of interleaving of frequencies may be utilized. In some aspects, the BS may configure (e.g., assign) overlapping time and/or frequency resources to multiple UEs. Each of the UEs assigned with the overlapping time and/or frequency resources may compete for the COT by performing an LBT in the overlapping resources based on one or more start times assigned to the UE. The UE may first sense the communications channel during the LBT window to determine if there are other devices using the channel prior to any transmission by the UE. In some aspects, the channel sensing procedure may rely on detecting energy levels on one or multiple sub-bands of the shared radio frequency band. The UE may perform the LBT in one or more beam direction(s) (e.g., 1, 2, 4, 8, 16, or more beam directions). In some instances, the beam direction(s) may be towards another sidelink UE that the UE intends to communicate with. The UE may configure its receiver to the specific beam direction and perform the LBT in the specific beam direction.

In some aspects, the UE may perform an unsuccessful LBT by sensing the energy in the channel and determining the sensed energy is above a threshold. In response to determining the LBT was unsuccessful, the UE may wait a period of time (e.g., a random back-off time period, a pre-configured back-off time period) and perform another LBT after waiting the period of time. In some aspects, the UE may wait a period of time before performing another LBT based on the next available start time. The sequence of determining an unsuccessful LBT, waiting the period of time, and performing another LBT may be performed multiple times during the LBT window.

At action 930, the method 900 includes the BS transmitting an indication of the selected start time to the UE. The UE may transmit a TB after the selected start time of the set of start times based on the LBT procedure being successful. If the LBT procedure is successful, then the UE may transmit one or more TB to the second UE. In this regard, the UE may transmit the TB(s) to the second UE in a physical sidelink shared channel (PSSCH). The UE may transmit the TB(s) to the second UE in at least one beam direction that has successfully cleared the LBT. In some aspects, the UE may transmit the one or more TBs based on the LBT configuration received from the BS. In some aspects, the UE and the second UE may execute a HARQ process for the potential retransmission of the TB.

In some aspects, the UE may not perform a successful LBT during the LBT window. In this case, the BS may receive a request from the BS for additional COT resources. In some aspects, the UE may perform a successful LBT and transmit TB(s) during the COT, but may not have been provided enough resources to complete transmission of all the TBs the UE intends to transmit. In this case, the BS may receive a request from the UE for additional COT resources to finish transmitting the TBs in the UE's buffer. In some aspects, the UE may perform a successful LBT and transmit TB(s) during the COT, but the receiving UE may not successfully decode the TB(s). In this case, the BS may receive a request from the UE for additional COT resources to retransmit the TBs that were not successfully decoded by the second (e.g., receiving) UE.

The BS may receive the request for additional COT resources from the UE via a physical uplink control channel (PUCCH). In this regard, the BS may configure periodic resources for the UE to transmit the request for additional COT resources. For example, the BS may reserve periodic time and frequency resources for the UE to transmit the request for additional COT resources via the PUCCH. In this regard, the BS may transmit an indication of the periodic PUCCH resources in an RRC message and/or a DCI_3 message. In response to receiving the request for additional COT resources, the BS may configure the UE for the additional resources for sidelink communications. For example, the BS may repeat action 910 described above. In some instances, the actions 910, 920, and 930 may be repeated until the UE has successfully transmitted all of the TBs the UE has scheduled to transmit in its buffer. In some instances, the BS may provide the UE with the same amount of resources as in the original resource allocation. For example, prior to executing action 910, the BS may receive from the UE a buffer status report (BSR) indicating an amount of TBs the UE intends to transmit (e.g., the amount of TBs the UE has scheduled to transmit in its buffer). The BS may configure the resources allocated to the UE based on the BSR. If the UE performs a successful LBT, but fails to transmit all of its TBs, or transmits one or more TBs that are not successfully decoded by the receiving UE, then the BS may configure the additional resources based on the previously transmitted BSR. In some aspects, the BS may configure the additional resources based on an updated BSR that reflects the results of actions 920 and 930. For example, the BS may transmit a grant for the additional COT resources having the same start time and the same COT duration as the previous grant. In some aspects, the BS may transmit a grant for the additional COT resources based on an amount of data left to be transmitted by the UE based on an updated BSR. In some aspects, the BS may transmit a grant for the additional COT resources based on the number of retransmissions required by the UE. In some aspects, the BS may receive from the UE a request for additional COT resources indicating the amount of resources requested by the UE. In response to the request, the BS may transmit the additional COT grant indicating the amount of resources requested by the UE.

In some aspects, the PUCCH resources assigned by the BS for requesting additional COT resources may be resources previously assigned to the UE for ACK/NACK feedback to the BS. For example, the indicator transmitted by the UE via the PUCCH indicating the request for additional COT resources may be a code point in the PUCCH. In this regard, the code point may be a single bit indicating the request. For example, if the code point has a value of '0' the UE does not request additional COT resources. If the code point has a value of '1' the UE requests additional COT resources. Using a single bit code point for indicating the request for additional COT resources may reduce network overhead compared to using a multi-bit code point, a medium access control-control element (MAC-CE) message, or a scheduling request for requesting the additional COT resources. Further, a single bit indicator indicating the request for additional COT resources may reduce network overhead as compared to reporting the status of each LBT performed to the BS for each of the slots and/or sub-slots scheduled in the original COT resources.

In some aspects, the UE may transmit the request for additional COT resources via the PUCCH in a licensed frequency band. In this case, the UE may not perform an LBT for gaining channel access and a single transmission of the PUCCH in the licensed band may be used. In some aspects, the BS may receive the request for additional COT resources via the PUCCH in an unlicensed frequency band (e.g., a shared frequency band). In this case, the BS may reserve resources (e.g., multiple contiguous or non-contiguous slots and/or sub-slots, a single slot and/or sub-slot, or other suitable resources) for the PUCCH transmission. In this regard, the BS may transmit an indication of the PUCCH resources in an RRC message and/or a DCI_3 message. The UE may perform one or more LBTs in the multiple contiguous slots and/or sub-slots. The UE may transmit the request for additional COT resources via the PUCCH in a slot or sub-slot after a successful LBT. In some aspects, the PUCCH resources may include periodic resources. The UE may fail to perform a successful LBT during the resources reserved for the PUCCH. In this case, the UE may wait for the next period of PUCCH resources and attempt one or more LBTs in the PUCCH resources.

Further aspects of the present disclosure include the following:

Aspect 1 includes a method of wireless communication performed by a first sidelink user equipment (UE), the method comprising receiving, from a base station (BS), an indicator indicating a set of start times associated with a transmission opportunity; performing a listen-before-talk (LBT) procedure for the transmission opportunity; and transmitting, to a second UE, a communication starting at a selected start time of the set of start times based on the LBT procedure being successful.

Aspect 2 includes the method of aspect 1, wherein the indicator further indicates a subset of the set of start times; and the transmitting the communication starting at the selected start time comprises transmitting the communication starting at a randomly selected start time of the subset of the set of start times.

Aspect 3 includes the method of any of aspects 1-2, further comprising receiving, from the BS, an indication of the selected start time via downlink control information (DCI).

Aspect 4 includes the method of any of aspects 1-3, wherein the selected start time is based on a priority level associated with the communication.

Aspect 5 includes the method of any of aspects 1-4, further comprising transmitting, to the BS, a buffer status report (BSR); and transmitting, to the BS, a request for an additional transmission opportunity based on the BSR.

Aspect 6 includes the method of any of aspects 1-5, wherein the transmitting the request comprises transmitting a code point via a physical uplink control channel (PUCCH); and the transmitting the BSR comprises transmitting the BSR before receiving the indicator indicating the set of start times associated with the transmission opportunity.

Aspect 7 includes the method of any of aspects 1-6, further comprising receiving, from the BS, a configured grant indicating resources in a licensed frequency band reserved for a physical uplink control channel (PUCCH); and wherein the transmitting the request comprises transmitting the request via the PUCCH in the licensed frequency band resources reserved for the PUCCH.

Aspect 8 includes the method of any of aspects 1-7, further comprising receiving, from the BS, a configured grant indicating multiple physical uplink control channel (PUCCH) transmission opportunities in an unlicensed frequency band; and performing one or more LBT procedures within one or more of the multiple PUCCH transmission opportunities, wherein the transmitting the request comprises transmitting the request via the PUCCH based on an LBT of the one or more LBT procedures performed within one or more of the multiple PUCCH transmission opportunities being successful.

Aspect 9 includes the method of any of aspects 1-8, wherein the request indicates a number of resources requested for the additional transmission opportunity.

Aspect 10 includes a method of wireless communication performed by a base station (BS), the method comprising transmitting, to a first user equipment (UE), an indicator indicating a set of start times associated with a transmission opportunity; selecting a start time from the set of start times based on a priority level associated with the first UE; and transmitting, to the first UE, an indication of the selected start time.

Aspect 11 includes the method of aspect 10, wherein the set of start times associated with the transmission opportunity is a subset of a plurality of start times associated with the transmission opportunity; and further comprising transmitting, to the UE, the selected start time via downlink control information (DCI).

Aspect 12 includes the method of any of aspects 10 or 11, further comprising receiving, from the UE, a buffer status report (BSR); receiving, from the UE, a request for an additional transmission opportunity; and transmitting, to the UE, a grant for resources associated with the additional transmission opportunity based on the BSR.

Aspect 13 includes method of any of aspects 10-12, further comprising transmitting, to the UE, a configured grant indicating resources in a licensed frequency band reserved for a physical uplink control channel (PUCCH); and wherein the receiving the request comprises receiving the request via the PUCCH in the licensed frequency band resources reserved for the PUCCH.

Aspect 14 includes the method of any of aspects 10-13, further comprising transmitting, to the UE, a configured grant indicating multiple physical uplink control channel (PUCCH) transmission opportunities in an unlicensed frequency band, wherein the receiving the request comprises receiving the request via the PUCCH in the unlicensed frequency band.

Aspect 15 includes the method of any of aspects 10-14, wherein the request indicates a number of resources requested for the additional transmission opportunity.

Aspect 16 includes a non-transitory computer-readable medium storing one or more instructions for wireless communication, the one or more instructions comprising one or more instructions that, when executed by one or more processors of a first sidelink user equipment, cause the one or more processors to perform any one of aspects 1-9.

Aspect 17 includes a non-transitory computer-readable medium storing one or more instructions for wireless communication, the one or more instructions comprising one or more instructions that, when executed by one or more processors of a base station (BS), cause the one or more processors to perform any one of aspects 10-15.

Aspect 18 includes a first sidelink user equipment (UE) comprising one or more means to perform any one or more of aspects 1-9.

Aspect 19 includes a base station (BS) comprising one or more means to perform any one or more of aspects 10-15.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a first sidelink user equipment (UE), the method comprising:
receiving, from a base station (BS), an indicator indicating a set of start times and a subset of the set of start times associated with a transmission opportunity for a sidelink communication with a second UE;

performing a listen-before-talk (LBT) procedure for the transmission opportunity; and transmitting, to the second UE, a communication starting at a randomly selected start time of the subset of the set of start times based on the LBT procedure being successful.

2. The method of claim 1, further comprising:
receiving, from the BS, an indication of the selected start time via downlink control information (DCI).

3. The method of claim 1, wherein the selected start time is based on a priority level associated with the communication.

4. The method of claim 1, further comprising:
transmitting, to the BS, a buffer status report (BSR); and
transmitting, to the BS, a request for an additional transmission opportunity based on the BSR.

5. The method of claim 4, wherein:
the transmitting the request comprises transmitting a code point via a physical uplink control channel (PUCCH); and
the transmitting the BSR comprises transmitting the BSR before receiving the indicator indicating the set of start times associated with the transmission opportunity.

6. The method of claim 4, further comprising:
receiving, from the BS, a configured grant indicating resources in a licensed frequency band reserved for a physical uplink control channel (PUCCH); and
wherein the transmitting the request comprises transmitting the request via the PUCCH in the licensed frequency band resources reserved for the PUCCH.

7. The method of claim 4, further comprising:
receiving, from the BS, a configured grant indicating multiple physical uplink control channel (PUCCH) transmission opportunities in an unlicensed frequency band; and
performing one or more LBT procedures within one or more of the multiple PUCCH transmission opportunities, wherein:
the transmitting the request comprises transmitting the request via the PUCCH based on an LBT of the one or more LBT procedures performed within one or more of the multiple PUCCH transmission opportunities being successful.

8. The method of claim 4, wherein the request indicates a number of resources requested for the additional transmission opportunity.

9. A method of wireless communication performed by a base station (BS), the method comprising:
determining a priority for a first user equipment (UE) and a second UE based on a packet delay budget associated with the first UE;
transmitting, to the first UE, an indicator indicating a set of start times associated with a transmission opportunity;
selecting a start time from the set of start times based on the priority; and
transmitting, to the first UE, an indication of the selected start time.

10. The method of claim 9, wherein the set of start times associated with the transmission opportunity is a subset of a plurality of start times associated with the transmission opportunity; and
further comprising:
transmitting, to the UE, the selected start time via downlink control information (DCI).

11. The method of claim 9, further comprising:
receiving, from the UE, a buffer status report (BSR);
receiving, from the UE, a request for an additional transmission opportunity; and
transmitting, to the UE, a grant for resources associated with the additional transmission opportunity based on the BSR.

12. The method of claim 11, further comprising:
transmitting, to the UE, a configured grant indicating resources in a licensed frequency band reserved for a physical uplink control channel (PUCCH); and
wherein the receiving the request comprises receiving the request via the PUCCH in the licensed frequency band resources reserved for the PUCCH.

13. The method of claim 11, further comprising:
transmitting, to the UE, a configured grant indicating multiple physical uplink control channel (PUCCH) transmission opportunities in an unlicensed frequency band, wherein the receiving the request comprises receiving the request via the PUCCH in the unlicensed frequency band.

14. The method of claim 11, wherein the request indicates a number of resources requested for the additional transmission opportunity.

15. A first sidelink user equipment (UE) comprising:
a memory;
a transceiver; and
at least one processor coupled to the memory and the transceiver, wherein the memory stores instructions that are executable by the at least one processor, individually or in any combination, to cause the first sidelink UE is to:
receive, from a base station (BS), an indicator indicating a set of start times and a subset of the set of start times associated with a transmission opportunity for a sidelink communication with a second UE;
perform a listen-before-talk (LBT) procedure for the transmission opportunity; and
transmit to the second UE, a communication starting at a randomly selected start time of the subset of the set of start times based on the LBT procedure being successful.

16. The first sidelink UE of claim 15, wherein the first sidelink UE is further configured to:
receive, from the BS, an indication of the selected start time via downlink control information (DCI).

17. The first sidelink UE of claim 15, wherein the selected start time is based on a priority level associated with the communication.

18. The first sidelink UE of claim 15, wherein the first sidelink UE is further configured to:
transmit, to the BS, a buffer status report (BSR); and
transmit, to the BS, a request for an additional transmission opportunity based on the BSR.

19. The first sidelink UE of claim 18, wherein the first sidelink UE is further configured to:
transmit the request by a code point via a physical uplink control channel (PUCCH); and
transmit the BSR before receiving the indicator indicating the set of start times associated with the transmission opportunity.

20. The first sidelink UE of claim 18, wherein the first sidelink UE is further configured to:
receive, from the BS, a configured grant indicating resources in a licensed frequency band reserved for a physical uplink control channel (PUCCH); and
transmit the request via the PUCCH in the licensed frequency band resources reserved for the PUCCH.

21. The first sidelink UE of claim 18, wherein the first sidelink UE is further configured to:
  receive, from the BS, a configured grant indicating multiple physical uplink control channel (PUCCH) transmission opportunities in an unlicensed frequency band;
  perform one or more LBT procedures within one or more of the multiple PUCCH transmission opportunities; and
  transmit the request via the PUCCH based on an LBT of the one or more LBT procedures performed within one or more of the multiple PUCCH transmission opportunities being successful.

22. The first sidelink UE of claim 18, wherein the request indicates a number of resources requested for the additional transmission opportunity.

23. A base station (BS) comprising:
  a memory;
  a transceiver; and
  at least one processor coupled to the memory and the transceiver, wherein the memory stores instructions that are executable by the at least one processor, individually or in any combination, to cause the BS is to:
  determine a priority for a first user equipment (UE) and a second UE based on a packet delay budget associated with the first UE;
  transmit, to the first UE, an indicator indicating a set of start times associated with a transmission opportunity;
  select a start time from the set of start times based on the priority; and
  transmit, to the first UE, an indication of the selected start time.

24. The BS of claim 23, wherein the set of start times associated with the transmission opportunity is a subset of a plurality of start times associated with the transmission opportunity; and
  the BS is further configured to:
    transmit, to the UE, the selected start time via downlink control information (DCI).

25. The BS of claim 23, wherein the BS is further configured to:
  receive, from the UE, a buffer status report (BSR);
  receive, from the UE, a request for an additional transmission opportunity; and
  transmit, to the UE, a grant for resources associated with the additional transmission opportunity based on the BSR.

26. The BS of claim 25, wherein the BS is further configured to:
  transmit, to the UE, a configured grant indicating resources in a licensed frequency band reserved for a physical uplink control channel (PUCCH); and
  receive the request via the PUCCH in the licensed frequency band resources reserved for the PUCCH.

27. The BS of claim 25, wherein the BS is further configured to:
  transmit, to the UE, a configured grant indicating multiple physical uplink control channel (PUCCH) transmission opportunities in an unlicensed frequency band; and
  receive the request via the PUCCH in the unlicensed frequency band.

28. The BS of claim 25, wherein the request indicates a number of resources requested for the additional transmission opportunity.

* * * * *